United States Patent
Gao et al.

(10) Patent No.: US 11,025,322 B2
(45) Date of Patent: Jun. 1, 2021

(54) PROGRESSIVE ADVANCED CSI FEEDBACK

(71) Applicant: Telefonaktiebolaget LM Ericsson (publ), Stockholm (SE)

(72) Inventors: Shiwei Gao, Nepean (CA); Sebastian Faxér, Järfälla (SE); Stephen Grant, Pleasanton, CA (US); Robert Mark Harrison, Grapevine, TX (US); Siva Muruganathan, Stittsville (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/757,165

(22) PCT Filed: Aug. 11, 2017

(86) PCT No.: PCT/IB2017/054910
§ 371 (c)(1),
(2) Date: Mar. 2, 2018

(87) PCT Pub. No.: WO2018/029644
PCT Pub. Date: Feb. 15, 2018

(65) Prior Publication Data
US 2018/0254813 A1    Sep. 6, 2018

Related U.S. Application Data

(60) Provisional application No. 62/374,179, filed on Aug. 12, 2016.

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01); *H04B 7/063* (2013.01); *H04B 7/0632* (2013.01); *H04B 7/0639* (2013.01)

(58) Field of Classification Search
CPC ...... H04B 7/0626; H04B 7/02; H04B 7/0456; H04B 7/063; H04B 7/0632; H04B 7/0639
See application file for complete search history.

(56) References Cited

U.S. PATENT DOCUMENTS

| 9,287,958 B2 | 3/2016 | Son et al. |
| 9,331,767 B1 | 5/2016 | Thomas et al. |

(Continued)

FOREIGN PATENT DOCUMENTS

| CN | 104009785 A | 8/2014 |
| CN | 104025657 A | 9/2014 |

(Continued)

OTHER PUBLICATIONS

3GPP TS 36.211 V13.0.0 3rd Generation Partnership Project; Technical Specification Group Radio Access Network; Evolved Universal Terrestrial Radio Access (E-UTRA); Physical Channels and Modulation (Release 13) (Dec. 2015) consisting of 141 pages.

(Continued)

*Primary Examiner* — Samina F Choudhry
(74) *Attorney, Agent, or Firm* — Christopher & Weisberg, P.A.

(57) ABSTRACT

Methods, wireless devices and base stations for determining multi-beam channel state information, CSI are provided. According to one aspect, embodiments include a method of determining multi-beam channel state information, CSI. The method includes generating a first CSI report associated with a first beam; and generating a second CSI report associated with a second beam, the second CSI report including at least a co-phasing coefficient between the first and second beams.

12 Claims, 20 Drawing Sheets

(56) References Cited

U.S. PATENT DOCUMENTS

| | | | |
|---|---|---|---|
| 2002/0187814 A1* | 12/2002 | Yoshida | H04B 7/0851 455/562.1 |
| 2010/0046667 A1 | 2/2010 | Tsutsui | |
| 2011/0026418 A1* | 2/2011 | Bollea | H01Q 1/2258 370/252 |
| 2011/0050489 A1* | 3/2011 | Maenpa | G01S 19/23 342/357.23 |
| 2011/0069773 A1* | 3/2011 | Doron | H04B 7/0634 375/267 |
| 2011/0305263 A1 | 12/2011 | Jongren et al. | |
| 2012/0033566 A1 | 2/2012 | Pora et al. | |
| 2013/0064129 A1 | 3/2013 | Koivisto et al. | |
| 2013/0107915 A1 | 5/2013 | Benjebbour et al. | |
| 2013/0163457 A1 | 6/2013 | Kim et al. | |
| 2013/0182787 A1 | 7/2013 | Kakishima et al. | |
| 2013/0201912 A1 | 8/2013 | Sheng et al. | |
| 2013/0308715 A1* | 11/2013 | Nam | H04B 7/0469 375/267 |
| 2013/0343215 A1* | 12/2013 | Li | H04B 7/024 370/252 |
| 2014/0003240 A1 | 1/2014 | Chen et al. | |
| 2014/0037029 A1* | 2/2014 | Murakami | H04L 27/34 375/340 |
| 2014/0050280 A1 | 2/2014 | Stirling-Gallacher et al. | |
| 2014/0146863 A1 | 5/2014 | Seol et al. | |
| 2014/0226611 A1 | 8/2014 | Kang et al. | |
| 2014/0301492 A1 | 10/2014 | Xin et al. | |
| 2014/0334564 A1* | 11/2014 | Singh | H04B 7/0617 375/267 |
| 2015/0049702 A1 | 2/2015 | Cheng et al. | |
| 2015/0078191 A1* | 3/2015 | Jongren | H04L 1/0026 370/252 |
| 2015/0207547 A1 | 7/2015 | Ko et al. | |
| 2015/0222340 A1* | 8/2015 | Nagata | H04W 16/28 375/267 |
| 2015/0315189 A1 | 11/2015 | Ametamey et al. | |
| 2015/0326285 A1 | 11/2015 | Zirwas et al. | |
| 2015/0381253 A1 | 12/2015 | Kim et al. | |
| 2016/0013838 A1 | 1/2016 | Zhu et al. | |
| 2016/0072562 A1 | 3/2016 | Onggosanusi et al. | |
| 2016/0127021 A1 | 5/2016 | Noh et al. | |
| 2016/0142117 A1* | 5/2016 | Rahman | H04B 7/0469 375/267 |
| 2016/0156401 A1* | 6/2016 | Onggosanusi | H04B 7/0478 370/329 |
| 2016/0173180 A1 | 6/2016 | Cheng et al. | |
| 2016/0192383 A1 | 6/2016 | Hwang et al. | |
| 2016/0323022 A1 | 11/2016 | Rahman et al. | |
| 2016/0352012 A1 | 12/2016 | Foo | |
| 2017/0134080 A1* | 5/2017 | Rahman | H04B 7/0456 |
| 2017/0134082 A1* | 5/2017 | Onggosanusi | H04B 7/0478 |
| 2017/0238323 A1 | 8/2017 | Marinier et al. | |
| 2017/0311187 A1 | 10/2017 | Dong et al. | |
| 2018/0034519 A1 | 2/2018 | Rahman et al. | |
| 2018/0131420 A1 | 5/2018 | Faxer et al. | |
| 2018/0191411 A1 | 7/2018 | Faxer et al. | |
| 2018/0219605 A1 | 8/2018 | Davydov et al. | |
| 2019/0036584 A1 | 1/2019 | Chang et al. | |
| 2019/0053220 A1* | 2/2019 | Zhang | H04W 36/0058 |

FOREIGN PATENT DOCUMENTS

| | | |
|---|---|---|
| CN | 104508994 A | 4/2015 |
| CN | 105210306 A | 12/2015 |
| CN | 105306121 A | 2/2016 |
| EP | 1 423 926 A1 | 6/2004 |
| KR | 10-2016-0029503 A | 3/2016 |
| WO | 2015060548 A1 | 4/2015 |
| WO | 2015/147814 A1 | 10/2015 |
| WO | 2015/190866 A1 | 12/2015 |
| WO | 2016/048223 A1 | 3/2016 |
| WO | 2016/080742 A1 | 5/2016 |
| WO | 2016/120443 A1 | 8/2016 |
| WO | 2017/168349 A1 | 10/2017 |

OTHER PUBLICATIONS

3GPP TS 36.212 V8.8.0 3rd Generation Partnership Project; Technical Specification Group Radio Access Network; Evolved Universal Terrestrial Radio Access (E-UTRA); Multiplexing and Channel Coding (Release 8) (Dec. 2009), consisting of 60 pages.

3GPP TS 36.212 V13.0.0 3rd Generation Partnership Project; Technical Specification Group Radio Access Network; Evolved Universal Terrestrial Radio Access (E-UTRA); Multiplexing and Channel Coding (Release 13) (Dec. 2015), consisting of 121 pages.

3GPP TS 36.212 V13.2.0 3rd Generation Partnership Project; Technical Specification Group Radio Access Network; Evolved Universal Terrestrial Radio Access (E-UTRA); Multiplexing and Channel Coding (Release 13) (Jun. 2016), consisting of 140 pages.

3GPP TS 36.213 V13.0.1 3rd Generation Partnership Project; Technical Specification Group Radio Access Network; Evolved Universal Terrestrial Radio Access (E-UTRA); Physical Layer Procedures (Release 13) (Jan. 2016), consisting of 326 pages.

3GPP TS 36.214 V13.2.0 3rd Generation Partnership Project; Technical Specification Group Radio Access Network; Evolved Universal Terrestrial Radio Access (E-UTRA); Physical Layer; Measurements (Release 13) (Jun. 2016), consisting of 19 pages.

3GPP TS 36.321 V13.0.0 3rd Generation Partnership Project; Technical Specification Group Radio Access Network; Evolved Universal Terrestrial Radio Access (E-UTRA); Medium Access Control (MAC) Protocol Specification (Release 13) (Dec. 2015), consisting of 82 pages.

3GPP TS 36.321 V13.2.0 3rd Generation Partnership Project; Technical Specification Group Radio Access Network; Evolved Universal Terrestrial Radio Access (E-UTRA); Medium Access Control (MAC) Protocol Specification (Release 13) (Jun. 2016), consisting of 91 pages.

3GPP TS 36.331 V13.1.0 3rd Generation Partnership Project; Technical Specification Group Radio Access Network; Evolved Universal Terrestrial Radio Access (E-UTRA); Radio Resource Control (RRC); Protocol Specification (Release 13) (Mar. 2016), consisting of 551 pages.

3GPP TS 36.331 V13.0.0 3rd Generation Partnership Project; Technical Specification Group Radio Access Network; Evolved Universal Terrestrial Radio Access (E-UTRA); Radio Resource Control (RRC); Protocol Specification (Release 13) (Dec. 2015), consisting of 507 pages.

Rahman et al., "Linear Combination Codebook Based CSI Feedback Scheme for FD-MIMO Systems" IEEE 2015, consisting of 6 pages.

3GPP TSG-RAN WG1 #82, R1-154557, Source: Ericsson; Beijing, China, Aug. 24-28, 2015; FD-MIMO Codebook Structure, Design Features, and Dimensioning; Agenda Item: 7.2.5.3.1, Document for Discussion and Decision, consisting of 8 pages.

3GPP TSG RAN WG1 Meeting #85, R1-164777; Source: Samsung; Nanjing, China, May 23-27, 2016; Hybrid PMI Codebook Based CSI Reporting and Simulation Results; Agenda Item: 6.2.3.2.2, Document for Discussion and Decision, consisting of 8 pages.

3GPP TSG-RAN WG1 #85, R1-165100; Source: Ericsson, Nanjing, China, May 23-27, 2016; "High Resolution CSI Feedback"; Agenda Item: 6.2.3.2.3, Document for Discussion and Decision, consisting of 8 pages.

3GPP TSG RAN Meeting #71, RP-160623; Source: Samsung, Goteborg, Sweden, Mar. 7-10, 2016; "New WID Proposal: Enhancements on Full-Dimension (FD) MIMO for LTE", Agenda Item: 10.1.1, Document for: Approval, consisting of 8 pages.

International Search Report and Written Opinion of the International Searching Authority dated Nov. 30, 2017 issued in corresponding PCT Application Serial No. PCT/IB2017/054913, consisting of 9 pages.

Invitation to Pay Additional Fees and, Where Applicable, Protest Fee dated Nov. 17, 2017 issued in corresponding PCT Application Serial No. PCT/IB2017/054911, consisting of 13 pages.

(56) References Cited

OTHER PUBLICATIONS

International Search Report and Written Opinion of the International Searching Authority dated Feb. 12, 2018 issued in corresponding PCT Application Serial No. PCT/IB2017/054911, consisting of 24 pages.
International Search Report and Written Opinion of the International Searching Authority dated Nov. 27, 2017 issued in corresponding PCT Application Serial No. PCT/IB2017/054912, consisting of 9 pages.
Notification of Transmittal of the International Preliminary Report on Patentability dated Nov. 22, 2018 issued in related PCT Application No. PCT/IB2017/054911 consisting of 24 pages.
Notification of Transmittal of the International Preliminary Report on Patentability dated Nov. 7, 2018 issued in related PCT Application No. PCT/IB2017/054912 consisting of 46 pages.
Notification of Transmittal of the International Preliminary Report on Patentability dated Nov. 20, 2018 issued in related PCT Application No. PCT/IB2017/054913 consisting of 46 pages.
LTE; Evolved Universal Terrestrial Radio Access (E-UTRA); Physical Layer Procedures, 3GPP TS 36.213 Version 13.2.0 Release 13 (Aug. 2016), consisting of 383 pages.
Invitation to Pay Additional Fees, and where Applicable, Protest Fee dated Feb. 16, 2018 issued in corresponding PCT Application Serial No. PCT/IB2017/054910, consisting of 14-pages.
Written Opinion of the International Preliminary Examining Authority dated Jul. 11, 2018 issued in corresponding PCT Application No. PCT/IB2017/054913 consisting of 6 pages.
Final Office Action dated Nov. 27, 2019 issued in U.S. Appl. No. 15/758,604, consisting of 14 pages.
Final Office Action dated Oct. 10, 2019 issued in U.S. Appl. No. 15/759,063, consisting of 16 pages.
Non-Final Office Action dated Jan. 31, 2020 issued in U.S. Appl. No. 16/594,555, consisting of 21 pages.

Indian Examination Report dated Aug. 18, 2020 and English translation thereof issued in corresponding Indian Patent Application No. 201937004361, consisting of 6 pages.
European Examination Report dated Aug. 14, 2020 issued in European Patent Application No. 17 767 929.7, consisting of 8 pages.
Non-Final Office Action dated Jul. 6, 2020 issued in U.S. Appl. No. 15/758,604, consisting of 8 pages.
Non-Final Office Action dated May 16, 2019 issued in U.S. Appl. No. 15/158,604, consisting of 27 pages.
Office Action dated May 3, 2019 issued in U.S. Appl. No. 15/759,063, consisting of 24 pages.
Office Action dated Mar. 18, 2019 issued in U.S. Appl. No. 15/759,400, consisting of 42 pages.
Chinese First Office Action and Search Report dated Dec. 25, 2020 issued in Chinese Patent Application No. 201780063472.3, consisting of 39 pages.
Chinese First Office Action and Search Report dated Dec. 11, 2020 issued in Chinese Patent Application No. 201780063408.5, consisting of 24 pages.
European Examination Report dated Jan. 29, 2021 issued in corresponding European Patent Application No. 17 767 929.7, consisting of 7 pages.
R1-154557; Ericsson: "FD-MIMO codebook structure, design features, and dimensioning", vol. RAN WGI, No. Beijing, China; Aug. 24, 2015-Aug. 28, 2015 Aug. 24-28, 2015 (Aug. 24, 2015), consisting of 8 pages.
R1-164777; Samsung: "Hybrid PMI codebook based CSI reporting and simulation results", vol. RAN WGI, No. Nanjing, China; May 23, 2016-May 27, 2016 May 23-27, 2016 (May 23, 2016); consisting of 8 pages.
Indian Examination Report dated Jan. 20, 2021 issued in Indian Application No. 201937004366, consisting of 6 pages.

* cited by examiner

● ORTHOGONAL DFT BEAMS   ○ OVERSAMPLED DFT BEAMS
◍ DFT BEAM CORRESPONDING TO PRECODER $w_{2D}(l = 2, m = 1)$

PRECODER ELEMENTS TO ANTENNA PORT MAPPING EXAMPLE: (N1,N2)=(4,2)

| SUBBAND# | PRECODER |
|---|---|
| 6 | $W_1(l,m)W_2(n_6)$ |
| 5 | $W_1(l,m)W_2(n_5)$ |
| 4 | $W_1(l,m)W_2(n_4)$ |
| 3 | $W_1(l,m)W_2(n_3)$ |
| 2 | $W_1(l,m)W_2(n_2)$ |
| 1 | $W_1(l,m)W_2(n_1)$ |

WIDEBAND (SYSTEM BANDWIDTH)

(a) CODEBOOK_CONFIG=1

| SUBBAND# | PRECODER |
|---|---|
| 6 | $W_1(l,m)W_2(s_6, n_6)$ |
| 5 | $W_1(l,m)W_2(s_5, n_5)$ |
| 4 | $W_1(l,m)W_2(s_4, n_4)$ |
| 3 | $W_1(l,m)W_2(s_3, n_3)$ |
| 2 | $W_1(l,m)W_2(s_2, n_2)$ |
| 1 | $W_1(l,m)W_2(s_1, n_1)$ |

(b) CODEBOOK_CONFIG=2 to 4

- ● ONE SET OF ORTHOGONAL DFT BEAMS
- ⊜ A DIFFERENT SET OF ORTHOGONAL DFT BEAMS OVER WHICH K BEAMS
- ◈ BEAM ASSOCIATED WITH $d_1$
- ○ OVERSAMPLED DFT BEAMS

PROGRESSIVE ADVANCED CSI FEEDBACK

CROSS-REFERENCE TO RELATED APPLICATIONS

This application is a Submission Under 35 U.S.C. § 371 for U.S. National Stage Patent Application of International Application Number: PCT/IB2017/054910, filed Aug. 11, 2017 entitled "PROGRESSIVE ADVANCED CSI FEEDBACK" which claims the benefit of U.S. Provisional Application No. 62/374,179, filed Aug. 12, 2016 entitled "PROGRESSIVE ADVANCED CSI FEEDBACK" both of which are incorporated herein by reference in their entireties.

TECHNICAL FIELD

This disclosure relates to wireless communications, and in particular, progressive advanced channel state information (CSI) feedback for wireless communications.

BACKGROUND

Long term evolution (LTE) uses orthogonal frequency division multiplexing (OFDM) in the downlink and discrete Fourier transform (DFT)-spread OFDM in the uplink. The basic LTE downlink physical resource can thus be seen as a time-frequency grid as illustrated in FIG. 1, where each resource element (RE) corresponds to one OFDM subcarrier during one OFDM symbol interval.

As shown in FIG. 2, in the time domain, LTE downlink transmissions are organized into radio frames of 10 ms, each radio frame consisting of ten equally-sized subframes of length Tsubframe=1 ms.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block (RB) pair. Resource blocks are numbered in the frequency domain, starting with 0 from one end of the system bandwidth. A physical resource block (PRB) is the minimum unit for resource allocation in LTE.

Downlink transmissions in LTE are dynamically scheduled, i.e., in each subframe the base station transmits control information over a Physical Downlink Control Channel (PDCCH) on which wireless devices such as terminals or user equipments (UEs) there are data to transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI) and can be either dynamically signaled over a Physical Control Formal Indicator Channel (PCFICH) or semi-statically configured over Radio Resource Control (RRC). The downlink subframe also contains common cell specific reference symbols (or signals) (CRS), which are known to the wireless device receiver and used for coherent demodulation of e.g. the control information. A downlink system with CFI=3 OFDM symbols as control is illustrated in FIG. 3.

From LTE Rel-11 onwards above described resource assignments can also be scheduled on the Enhanced Physical Downlink Control Channel (EPDCCH). For Rel-8 to Rel-10 only Physical Downlink Control Channel (PDCCH) is available.

The reference symbols (or signals) shown in FIG. 3 are the cell specific reference symbols (or signals) (CRS) and are used to support multiple functions including fine time and frequency synchronization and channel estimation for certain transmission modes.

In a cellular communication system there is a need to measure the channel conditions in order to know what transmission parameters to use. These parameters include, e.g., modulation type, coding rate, transmission rank, and frequency allocation. This applies to uplink (UL) as well as downlink (DL) transmissions.

In LTE, a number of physical DL channels are supported. A downlink physical channel corresponds to a set of resource elements carrying information originating from higher layers. Physical Downlink Shared Channel (PDSCH) is used mainly for carrying user traffic data and higher layer messages. PDSCH is transmitted in a DL subframe outside of the control region as shown in FIG. 3. Both PDCCH and evolved-PDCCH (EPDCCH) are used to carry Downlink Control Information (DCI) such as PRB allocation, modulation level and coding scheme (MCS), the precoder used at the transmitter, and etc. PDCCH is transmitted in the first one to four OFDM symbols in a DL subframe, i.e. the control region, while EPDCCH is transmitted in the same region as PDSCH.

In the uplink, two physical channels are supported in LTE for carrying a wireless device's uplink data and control information, i.e., Physical Uplink Shared Channel (PUSCH) and Physical Uplink Control Channel (PUCCH). Uplink control signaling from a wireless device to the base station includes:

Acknowledgements/non-acknowledgements (Ack/Nack) for received downlink data;
Channel Status reports related to the downlink channel conditions, used as assistance for the downlink scheduling; and
Scheduling requests (SRs), indicating that a mobile terminal needs uplink resources for uplink data transmissions.

If the wireless device has not been assigned an uplink resource for data transmission, the control information (channel-status reports, Ack/Nack, and scheduling requests) is transmitted in uplink resources (resource blocks) specifically assigned for uplink control on PUCCH. As illustrated in FIG. 4, these resources are located at the edges of the total available system bandwidth. Each such resource consists of twelve "subcarriers" (one resource block) within each of the two slots of an uplink subframe. In order to provide frequency diversity, these frequency resources are frequency hopped on the slot boundary, i.e. one "resource" consists of 12 subcarriers at the upper part of the spectrum within the first slot of a subframe and an equally sized resource at the lower part of the spectrum during the second slot of the subframe or vice versa. If more resources are needed for the uplink control signaling, e.g., in case of very large overall transmission bandwidth supporting a large number of users, additional resources blocks can be assigned next to the previously assigned resource blocks.

There are multiple formats defined for PUCCH, in which each format is capable of carrying a different number of bits. With reference to this known concept, PUCCH format 2 is discussed below.

Channel-status reports are used to provide the base station, e.g., eNodeB, with an estimate of the channel properties at the terminal in order to aid channel-dependent scheduling. A channel-status report consists of multiple bits per subframe. PUCCH format 1, which is capable of at most two bits of information per subframe, can obviously not be used for this purpose. Transmission of channel-status reports on the PUCCH is instead handled by PUCCH format 2 (There are actually three variants in the LTE specifications, formats 2, 2a and 2b, where the last two formats are used for simultaneous transmission of Ack/Nack and channel status report). Up to 11 bits of channel status report can be carried on PUCCH Format 2. In many cases, the channel status information has more than 11 bits and multiple transmissions over PUCCH format 2 are needed. For this purpose, many different report types have been defined with different combinations of channel status information such as wideband channel rank indicator (RI), wideband precoding matrix indicator (PMI), wideband channel quality indicator (CQI), subband PMI and CQI, etc.

Channel status reporting over PUCCH is periodic. i.e. the status is reported periodically. The periodicity and subframe offsets are semi-statically configured. The PUCCH format 2 resources are also semi-statically configured.

Different down link control information (DCI) formats are defined in LTE for DL and UL data scheduling. For example, DCI formats 0 and 4 are used for uplink (UL) data scheduling while DCI formats 1, 1A, 1B, 1C, 1D, 2, 2A, 2B, 2C, and 2D are used for DL data scheduling. In the DL, which DCI format is used for data scheduling is associated with a DL transmission scheme and/or the type of message to be transmitted. An uplink grant can be sent to a wireless device using either DCI format 0 or DCI format 4, depending on the uplink transmission mode configured. For wireless devices supporting uplink MIMO transmission, DCI format 4 is used. Otherwise, DCI format 0 is used.

Multi-antenna techniques can significantly increase the data rates and reliability of a wireless communication system. The performance is in particular improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. One component in LTE is the support of MIMO antenna deployments and MIMO related techniques. Currently, LTE Release 13 enhanced MIMO (eMIMO) supports an 8-layer spatial multiplexing mode for up to 16 Tx antenna ports with channel dependent precoding. The spatial multiplexing mode is aimed for high data rates in favorable channel conditions. An illustration of the spatial multiplexing operation by a precoding matrix 2 is provided in FIG. 5.

As seen, the information carrying symbol vector s from layers 1-r 4 is multiplied by an $N_T \times r$ precoder matrix W, 12 which distributes the transmit energy in a subspace of the $N_T$ (corresponding to $N_T$ antenna ports) dimensional vector space to produce signals to be inverse Fourier transformed 6. The precoder matrix 12 is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink, and DFT (Discrete Fourier Transform) precoded OFDM in the uplink. Hence, the received $N_R \times 1$ vector $y_n$ for a certain TFRE on subcarrier n (or alternatively data TFRE number n) is thus modeled by $$y_n = H_n W s_n + e_n \qquad \text{Equation 1}$$

where $e_n$ is a noise/interference vector obtained as realizations of a random process. The precoder W can be a wideband precoder (that is, the precoder is constant over the whole scheduled band) or frequency selective (that is, the precoder can vary within the whole scheduled band).

The precoder matrix W is often chosen to match the characteristics of the $N_R \times N_T$ MIMO channel matrix $H_n$, resulting in so-called channel dependent precoding. This is also commonly referred to as closed-loop precoding and essentially strives for focusing the transmit energy into a subspace which is strong in the sense of conveying much of the transmitted energy to the wireless device. In addition, the precoder matrix may also be selected to strive for orthogonalizing the channel, meaning that after proper linear equalization at the wireless device, the inter-layer interference is reduced.

One example method for a wireless device to select a precoder matrix W can be to select the $W_k$ that maximizes the Frobenius norm of the hypothesized effective channel:

$$\max_k \left\| \hat{H}_n W_k \right\|_F^2 \qquad \text{Equation 2}$$

Where
  $\hat{H}_n$ is a channel estimate, possibly derived from CSI-RS as described below.
  $W_k$ is a hypothesized precoder matrix belonging to a codebook.
  $\hat{H}_n W_k$ is the hypothesized effective channel In closed-loop precoding for the LTE downlink, the wireless device transmits, based on channel measurements in the forward link (downlink), recommendations to the eNodeB of a suitable precoder to use. The base station configures the wireless device to provide feedback according to the transmission mode of the wireless device, and may transmit CSI-RS and configure the wireless device to use measurements of CSI-RS to feedback recommended preceding matrices that the wireless device selects from a codebook. A single precoder that is applicable to the whole bandwidth (wideband precoding) may be fed back. It may also be beneficial to match the frequency variations of the channel and instead feedback a frequency-selective precoding report, e.g., several precoders, one per subband, where a bandwidth is divided into multiple subbands. This is an example of the more general case of channel state information (CSI) feedback, which also encompasses feeding back other information in addition to the recommended precoders to assist the eNodeB in subsequent transmissions to the wireless device. Such other information may include channel quality indicators (CQIs) as well as transmission rank indicator (RI).

In LTE, the format of the CSI reports are specified in detail and may contain CQI (Channel-Quality Information). Rank Indicator (RI), and Precoding Matrix Indicator (PMI). The reports can be wideband (i.e. applicable to the whole bandwidth) or subbands (i.e. applicable to part of the bandwidth). They can be configured by a radio resource control (RRC) message to be sent periodically or in an aperiodic manner triggered by a DCI sent from the base station to a wireless device. It is highly desirable to have a timely and a high quality CSI at the base station in order to make the best possible scheduling decisions for downlink (DL) transmissions.

An aperiodic CSI request is indicated in the CSI Request field in DCI format 0 or DCI format 4. The number of bits in the field varies from 1 bit to 3 bits, depending on wireless device configuration. For example, for wireless devices configured with 1 to 5 carriers (or cells) and/or multiple CSI processes, 2 bits are used, and for wireless device configured with more than 5 carriers, 3 bits are used. Table 1 shows the CSI request fields when a wireless device is configured with a single carrier (i.e., serving cell c) and 2 sets of CSI-RS processes. If a wireless device is configured with a single carrier and a single or no CSI process, a single bit is used. The concept of CSI process was introduced in LTE Rel-11, where a CSI process is defined as a configuration of a channel measurement resource and an interference measurement resource and up to four CSI processes can be configured for a wireless device.

TABLE 1

| Value of CSI request field | Description |
| --- | --- |
| '00' | No aperiodic CSI report is triggered |
| '01' | Aperiodic CSI report is triggered for a set of CSI process(es) configured by higher layers for serving cell$_c$ |
| '10' | Aperiodic CSI report is triggered for a 1$^{st}$ set of CSI process(es) configured by higher layers |
| '11' | Aperiodic CSI report is triggered for a 2$^{nd}$ set of CSI process(es) configured by higher layers |

Given the CSI feedback from the wireless device, the base station determines the transmission parameters it wishes to use to transmit to the wireless device, including precoding matrix, transmission rank, and modulation and coding state (MCS). These transmission parameters may differ from the recommendations made by the wireless device. Therefore, a rank indicator and MCS may be signaled in downlink control information (DCI), and the precoding matrix can be signaled in DCI or the base station can transmit a demodulation reference signal (DMRS) from which the effective channel (i.e., $H_n W$) can be measured. The transmission rank, and thus the number of spatially multiplexed layers, is reflected in the number of columns of the precoder W. For efficient performance, it is important that a transmission rank that matches the channel properties is selected.

In LTE Release-10, a new reference symbol or signal sequence was introduced for the intent to estimate downlink channel state information, the CSI-RS (channel state information reference signal). The CSI-RS provides several advantages over basing the CSI feedback on the common reference symbols (CRS) which were used, for that purpose, in LTE Releases 8-9. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resource to measure on can be configured in a wireless device specific manner).

By measuring a CSI-RS transmitted from the base station, a wireless device can estimate the effective channel the CSI-RS is traversing including the radio propagation channel and antenna gains. In more mathematical rigor this implies that if a known CSI-RS signal $_x$ is transmitted, a wireless device can estimate the coupling between the transmitted signal and the received signal (i.e., the effective channel). Hence if no virtualization is performed in the transmission, the received signal y can be expressed as $$y = Hx + e \quad \text{Equation 3}$$

and the wireless device can estimate the effective channel H.

Up to eight CSI-RS ports can be configured in LTE Rel-10, that is, the wireless device can estimate the channel from up to eight transmit antennas.

Related to CSI-RS is the concept of zero-power CSI-RS resources (also known as a muted CSI-RS) that are configured just as regular CSI-RS resources, so that a wireless device knows that the data transmission is mapped around those resources (i.e., the zero-power CSI-RS resources are not used for data transmissions). The intent of the zero-power CSI-RS resources is to enable the network to mute the transmission on the corresponding resources in order to boost the SINR of a corresponding non-zero power CSI-RS, possibly transmitted in a neighbor cell/transmission point. In Release-11 of LTE, a special zero-power CSI-RS was introduced that a wireless device is mandated to use for measuring interference plus noise, the zero-power CSI-RS resource is also known as interference measurement (IM) resource. A wireless device can assume that the serving base station is not transmitting on the zero-power CSI-RS resource, and the received power on the resource can therefore be used as a measure of the interference plus noise.

Based on a configured CSI-RS resource and an interference measurement resource (e.g., a zero-power CSI-RS resource), a wireless device can estimate the effective channel and noise plus interference, and consequently also determine the rank, precoding matrix, and MCS to best match the particular channel.

Antenna arrays may be (partly) described by the number of antenna columns corresponding to the horizontal dimension $N_h$, the number of antenna rows corresponding to the vertical dimension $N_v$ and the number of dimensions corresponding to different polarizations Np. The total number of antennas is thus $N = N_h N_v N_p$. It should be pointed out that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

An example of a 4×4 array with cross-polarized antenna elements is illustrated in FIG. 6. Precoding may be interpreted as multiplying the signal to be transmitted with a set of complex beamforming weights prior to transmission over multiple antenna ports. A typical approach is to tailor the precoder to the antenna form factor, i.e. taking into account $N_h$, $N_v$, and $N_p$ when designing the precoder codebook.

A common type of precoder is a DFT-precoder, where the precoder used to precode a single-layer transmission using a single-polarized uniform linear array (ULA) with $N_1$ antennas is defined as $$w_{1D}(l, N_1, O_1) = \frac{1}{\sqrt{N_1}} \begin{bmatrix} e^{j2\pi \cdot 0 \frac{l}{O_1 N_1}} \\ e^{j2\pi \cdot 1 \frac{l}{O_1 N_1}} \\ \vdots \\ e^{j2\pi \cdot (N_1-1) \frac{l}{O_1 N_1}} \end{bmatrix} \quad \text{Equation 4}$$

where $l = 0, 1, \ldots O_1 N_1 - 1$ is the precoder index and $O_1$ is an integer oversampling factor. A precoder for a dual-polarized uniform linear array (ULA) with $N_1$ antennas for each polarization (and so $2N_1$ antennas in total) can be similarly defined as $$w_{1D,DP}(l, N_1, O_1) = \begin{bmatrix} w_{1D}(l) \\ e^{j\phi} w_{1D}(l) \end{bmatrix} = \begin{bmatrix} w_{1D}(l) & 0 \\ 0 & w_{1D}(l) \end{bmatrix} \begin{bmatrix} 1 \\ e^{j\phi} \end{bmatrix} \quad \text{Equation 5}$$

where $e^{j\phi}$ is a co-phasing factor between the two polarizations that may for instance be selected from a QPSK alphabet $$\phi \in \left\{0, \frac{\pi}{2}, \pi, \frac{3\pi}{2}\right\}.$$

A corresponding precoder vector for a two-dimensional uniform planar array (UPA) with $N_1 \times N_2$ antennas can be created by taking the Kronecker product of two one dimension precoder vectors as $w_{2D}(l, m) = w_{1D}(l, N_1, O_1) \otimes w_{1D}(m, N_2, O_2)$, where $O_2$ is an integer oversampling factor in the $N_2$ dimension. Each precoder $w_{2D}(l, m)$ forms a 2D DFT beam, or a signal radiation pattern having its maximum power gain at a certain direction, all the precoders $\{w_{2D}(l, m), l=0, \ldots, N_1 O_1-1; m=0, \ldots, N_2 O_2-1\}$ form a grid of DFT beams. An example is shown in FIG. 7, where ($N_1$, $N_2$)=(4,2) and ($O_1$, $O_2$)=(4,4). Each of the grid of DFT beams points to a spatial direction which can be described by an azimuth and elevation angle. Throughout the following sections, the terms 'DFT beams' and 'DFT precoders' are used interchangeably.

More generally, a beam with an index pair (l, m) can be identified by the direction in which the greatest energy is transmitted when precoding weights $w_{2D}(l, m)$ are used in the transmission. Also, a magnitude taper can be used with DFT beams to lower the beam's sidelobes, the beam pattern at directions away from the main beam. A 1D DFT precoder along $N_1$ and $N_2$ dimensions with magnitude tapering can be expressed as $$w_{1D}(l, N_1, O_1, \beta) = \frac{1}{\sqrt{N_1}} \begin{bmatrix} \beta_0 e^{j2\pi \cdot 0 \frac{l}{O_1 N_1}} \\ \beta_1 e^{j2\pi \cdot 1 \frac{l}{O_1 N_1}} \\ \vdots \\ \beta_{N_1-1} e^{j2\pi \cdot (N_1-1) \frac{l}{O_1 N_1}} \end{bmatrix}, \text{ and}$$

$$w_{1D}(m, N_2, O_2, \gamma) = \frac{1}{\sqrt{N_2}} \begin{bmatrix} \gamma_0 e^{j2\pi \cdot 0 \frac{m}{O_2 N_2}} \\ \gamma_1 e^{j2\pi \cdot 1 \frac{m}{O_2 N_2}} \\ \vdots \\ \gamma_{N_2-1} e^{j2\pi \cdot (N_2-1) \frac{m}{O_2 N_2}} \end{bmatrix}$$

Where $0 < \beta_i, \gamma_k \leq 1$ (i=0, 1, ..., $N_1$-1; k=0, 1, ..., $N_2$-1) are amplitude scaling factors. $\beta_i=1, \gamma_k=1$ (i=0, 1, ..., $N_1$-1; k=0, 1, ..., $N_2$-1) correspond to no tapering. DFT beams (with or without a magnitude taper) have a linear phase shift between elements along each of the two dimensions. Without loss of generality, we assume that the elements of w(l, m) are ordered according to w(l, m)=$w_{1D}(l, N_1, O_1, \beta) \otimes w_{1D}(m, N_2, O_2, \gamma)$ such that adjacent elements correspond to adjacent antenna elements along dimension $N_2$, and elements of w(l, m) spaced $N_2$ apart correspond to adjacent antenna elements along dimension $N_1$. Then the phase shift between two elements $w_{s_1}(l, m)$ and $w_{s_2}(l, m)$ of w(l, m) can be expressed as:

$$w_{s_2}(l, m) = w_{s_1}(l, m) \cdot \left(\frac{\alpha_{s_2}}{\alpha_{s_1}}\right) \cdot e^{j2\pi((k_1-i_1)\Delta_1 + (k_2-i_2)\Delta_2)}$$

Where $s_1 = i_1 N_2 + i_2$ and $s_2 = k_1 N_2 + k_2$ (with $0 \leq i_2 < N_2$, $0 \leq i_1 < N_1$, $0 \leq k_2 < N_2$ and $0 \leq k_1 < N_1$) are integers identifying two entries of the beam w(l, m) so that ($i_1$, $i_2$) indicates to a first entry of beam w(l, m) that is mapped to a first antenna element (or port) and ($k_1$, $k_2$) indicates to a second entry of beam w(l, m) that is mapped to a second antenna element (or port).

$\alpha_{s_1} = \beta_{i_1} \gamma_{i_2}$ and $\alpha_{s_2} = \beta_{k_1} \gamma_{k_2}$ are real numbers. $\alpha_i \neq 1$ (i=$s_1$, $s_2$) if magnitude tapering is used; otherwise $\alpha_i = 1$.

$$\Delta_1 = \frac{l}{O_1 N_1}$$

is a phase shift corresponding to a direction along an axis, e.g. the horizontal axis ('azimuth')

$$\Delta_2 = \frac{m}{O_2 N_2}$$

is a phase shift corresponding to direction along an axis, e.g. the vertical axis ('elevation')

Therefore, a $k^{th}$ beam d(k) formed with precoder $w(l_k, n_k)$ can also be referred to by the corresponding precoder $w(l_k, m_k)$, i.e. d(k)=$w(l_k, m_k)$. Thus a beam d(k) can be described or has associated by a set of complex numbers, each element of the set being characterized by at least one complex phase shift such that an element of the beam is related to any other element of the beam where $d_n(k) = d_i(k) \alpha_{i,n} e^{j2\pi(p\Delta_{1,k} + q\Delta_{2,k})} = d_i(k) \alpha_{i,n} (e^{j2\pi\Delta_{1,k}})^p (e^{j2\pi\Delta_{2,k}})^q$, where $d_i(k)$ is the $i^{th}$ element of a beam d(k). $\alpha_{i,n}$ is a real number corresponding to the $i^{th}$ and $n^{th}$ elements of the beam d(k); p and q are integers; and $\Delta_{1,k}$ and $\Delta_{2,k}$ are real numbers corresponding to a beam with index pair ($l_k$, $m_k$) that determine the complex phase shifts $e^{j2\pi\Delta_{1,k}}$ and $e^{j2\pi\Delta_{2,k}}$, respectively. Index pair ($l_k$, $m_k$) corresponds to a direction of arrival or departure of a plane wave when beam d(k) is used for transmission or reception in a UPA or ULA. A beam d(k) can be identified with a single index k' where k'=$l_k + N_1 O_1 m_k$, i.e. along vertical or $N_2$ dimension first, or alternatively k'=$N_2 O_2 l_k + m_k$, i.e. along horizontal or $N_1$ dimension first.

An example of precoder elements of a beam w(l, m) to antenna ports mapping is shown in FIG. 8, where a single polarization 2D antenna with (N1,N2)=(4,2) is illustrated, $w_i(l, m)$ is applied on the transmit (Tx) signal to port i (i=E1, E2, ..., E8). There is a constant phase shift between any two precoder elements associated with two adjacent antenna ports along each dimension. For example, with $\Delta_2$ defined as above, the phase shift between $w_1(l, m)$ and $w_2(l, m)$ is $e^{j2\pi\Delta_2}$, which is the same as the phase shift between $w_7(l, m)$ and $w_8(l, m)$. Similarly, with $\Delta_1$ defined as above, the phase shift between $w_2(l, m)$ and $w_4(l, m)$ is $e^{j2\pi\Delta_1}$, which is the same as the phase shift between $w_5(l, m)$ and $w_7(l, m)$.

Extending the precoder for a dual-polarized ULA may then be done as $$w_{2D,DP}(l, m, \phi) = \begin{bmatrix} 1 \\ e^{j\phi} \end{bmatrix} \otimes \quad \text{Equation 6}$$

$$w_{2D}(l, m) = \begin{bmatrix} w_{2D}(l, m) \\ e^{j\phi} w_{2D}(l, m) \end{bmatrix} = \begin{bmatrix} w_{2D}(l, m) & 0 \\ 0 & w_{2D}(l, m) \end{bmatrix} \begin{bmatrix} 1 \\ e^{j\phi} \end{bmatrix}$$

A precoder matrix $W_{2D,DP}$ for multi-layer transmission may be created by appending columns of DFT precoder vectors as $$W_{2D,DP}{}^{(R)} = [w_{2D,DP}(l_1, m_1, \phi_1) w_{2D,DP}(l_2, m_2, \phi_2) \ldots w_{2D,DP}(l_R, m_R, \phi_R)]$$

where R is the number of transmission layers, i.e. the transmission rank. In a special case for a rank-2 DFT precoder, $m_1 = m_2 = m$ and $l_1 = l_2 = l$, we have $$W_{2D,DP}^{(2)}(l, m, \phi_1, \phi_2) = [w_{2D,DP}(l, m, \phi_1) \; w_{2D,DP}(l, m, \phi_2)] = \quad \text{Equation 7}$$

$$\begin{bmatrix} w_{2D}(l, m) & 0 \\ 0 & w_{2D}(l, m) \end{bmatrix} \begin{bmatrix} 1 & 1 \\ e^{j\phi_1} & e^{j\phi_2} \end{bmatrix}$$

For each rank, all the precoder candidates form a 'precoder codebook' or a 'codebook'. A wireless device can first determine the rank of the estimated downlink wideband channel based CSI-RS. After the rank is identified, for each subband the wireless device then searches through all the precoder candidates in a codebook for the determined rank to find the best precoder for the subband. For example, in case of rank=1, the wireless device would search through $w_{2D,DP}(k, l, \phi)$ for all the possible $(k, l, \phi)$ values. In case of rank=2, the wireless device would search through $W_{2D,DP}(k, l, \phi_1, \phi_2)$ for all the possible $(k, l, \phi_1, \phi_2)$ values.

DFT based precoders discussed above are used in LTE Rel-13 full dimension MIMO (FD-MIMO) codebook designs in which five parameters are signalled to a wireless device, i.e. $N_1$, $N_2$, $O_1$, $O_2$ and a parameter called "Codebook-Config", which can have a value from 1 to 4.

For Codebook-Config=1, the same single-polarized precoder, $w_{2D}(l, m)$, is assumed for all subbands and only the phase $\phi$ of the co-phasing factor $e^{j\phi}$ may vary among subbands. The dual-polarization 2D precoders are For rank = 1:

$$W_{2D,DP}^{(1)}(l, m, n) = \begin{bmatrix} w_{2D}(l, m) & 0 \\ 0 & w_{2D}(l, m) \end{bmatrix} \begin{bmatrix} 1 \\ e^{j\phi_n} \end{bmatrix} \quad \text{Equation 8}$$

$$= W_1(l, m) W_2^{(1)}(n)$$

For rank = 2:

$$W_{2D,DP}^{(2)}(l, m, n) = \begin{bmatrix} w_{2D}(l, m) & 0 \\ 0 & w_{2D}(l, m) \end{bmatrix} \begin{bmatrix} 1 & 1 \\ e^{j\phi_n} & -e^{j\phi_n} \end{bmatrix} \quad \text{Equation 9}$$

$$= W_1(l, m) W_2^{(2)}(n)$$

where $W_1(l, m) = \begin{bmatrix} w_{2D}(l, m) & 0 \\ 0 & w_{2D}(l, m) \end{bmatrix}$, $l = 0, 1, \ldots, O_1 N_1 - 1; m = 0, 1, \ldots, O_2 N_2 - 1$;

$$W_2^{(1)}(n) = \begin{bmatrix} 1 \\ e^{j\phi_n} \end{bmatrix} \text{ for rank} = 1 \text{ and}$$

$$W_2^{(2)}(n) = \begin{bmatrix} 1 & 1 \\ e^{j\phi_n} & -e^{j\phi_n} \end{bmatrix} \text{ for rank} = 2,$$

and $\phi_n = \dfrac{\pi n}{2}$, $n = 0, 1, 2, 3$.

The codebook for each rank is defined as the set of precoders $\{W_{2D,DP}(l, m, n), l=0, 1, \ldots, O_1 N_1 -1; m=0, 1, \ldots, O_2 N_2-1; n=0, 1, 2, 3\}$. A wireless device determines the best $W_1(l, m)$ for the whole bandwidth (or wideband) and reports back the indices (l, m). The wireless device also determines the best $W_2(n)$ for each subband and reports back the corresponding index n. For M subbands, M indices $\{n_1, n_2, \ldots, n_M\}$ are reported.

For Codebook-Config=2 to 4, however, it is assumed that different beams may be selected in different subbands. The different precoders are selected from a precoder group or beam group consisting of four adjacent single-polarized precoders, $\{w_{2D}(l_i, m_i), i=1, 2, 3, 4\}$. In this case, $W_1$ consists of the four single-polarized precoders:

$$W_1(l, m) = \begin{bmatrix} w_{2D} & w_{2D} & w_{2D} & w_{2D} & 0 & 0 & 0 & 0 \\ (l_1, & (l_2, & (l_3, & (l_4, & & & & \\ m_1) & m_2) & m_3) & m_4) & & & & \\ 0 & 0 & 0 & 0 & w_{2D} & w_{2D} & w_{2D} & w_{2D} \\ & & & & (l_1, m_1) & (l_2, m_2) & (l_3, m_3) & (l_4, m_4) \end{bmatrix}$$

Where $(l_i, m_i) = (l + \Delta l_i, m + \Delta m_i)$; $0 \leq \Delta l_i \leq O_1 - 1$, $0 \leq \Delta m_i \leq O_2 - 1$ are integers as shown in Table 2; $(\Delta l_1, \Delta m_1) = (0, 0)$; $l = 0, 2, 4, \ldots, O_1 N_1 - 1$; $m = 0, 2, 4, \ldots, O_2 N_2 - 1$. $w_{2D}(l_1, m_1)$ is referred to as the leading beam of the beam group. Only the first precoder index (l, m) needs to be reported. Examples of a beam group for Codebook_config=2 to 4 are shown in FIGS. 9-11.

TABLE 2

| Codebook_config value | $(\Delta l_1, \Delta m_1)$ | $(\Delta l_2, \Delta m_2)$ | $(\Delta l_3, \Delta m_3)$ | $(\Delta l_4, \Delta m_4)$ |
|---|---|---|---|---|
| 2 | (0, 0) | (1, 0) | (1, 1) | (1, 0) |
| 3 | (0, 0) | (0, 1) | (2, 0) | (2, 0) |
| 4 | (0, 0) | (1, 1) | (3, 1) | (3, 0) |

For Codebook_config=2 to 4, $W_2$ for each subband consists of two parts, i.e. beam selection and co-phasing. For rank=1

$$W_2(s, n) = \begin{bmatrix} e_s & 0 \\ 0 & e_s \end{bmatrix} \begin{bmatrix} 1 \\ e^{j\phi_n} \end{bmatrix} = \begin{bmatrix} e_s \\ e^{j\phi_n} e_s \end{bmatrix} \quad \text{Equation 10}$$

Where $e_s$ (s=1, 2, 3, 4) is a 4×1 vector with the $s^{th}$ entry equals to 1 and the rest of the entries equal to zero (e.g. $e_2=[0, 1\ 0\ 0]^T$, $(.)^T$ denotes transpose), and is used to select the precoder $w_{2D}(l_s, m_s)$ in $W_1(l, m)$. So for each subband, the index (s, n) is also reported under Codebook_config=2 to 4. Two bits are needed for s and another two bits are for n, thus 4 bits are needed for reporting $W_2(s, n)$ for each subband.

For rank = 2

$$W_2^{(2)}(s, s', n) = \begin{bmatrix} e_s & e_{s'} \\ e_s e^{j\phi_n} & -e_{s'} e^{j\phi_n} \end{bmatrix}$$ Equation 11

There are 8 pairs of (s, s') as shown in Table 3 and n=0, 1, so again 4 bits are used for reporting $W_2(S, s', n)$ for each subband.

TABLE 3

| Codebook_config value | (s, s') |
|---|---|
| 2 | (1, 1), (2, 2), (3, 3), (4, 4), (1, 2), (3, 4), (1, 3), (2, 4) |
| 3 | (1, 1), (2, 2), (3, 3), (4, 4), (1, 2), (2, 3), (1, 4), (2, 4) |
| 4 | (1, 1), (2, 2), (3, 3), (4, 4), (1, 2), (2, 3), (1, 4), (2, 4) |

FIG. 9 shows an example of the feedback precoders (rank=1) by a wireless device for each subband under Codebook_config=1 and Codebook_config=2 to 4, where the system bandwidth consists of 6 subbands, $n_i \in \{0, 1, 2, 3\}$ and $s_i \in \{1, 2, 3, 4\}$, i=1, 2, . . . , 6. Note that for Codebook_config=1, only co-phasing factor varies across subbands for $W_2$ while for Codebook_config=2 to 4, both beam and co-phasing vary across subbands.

With multi-user MIMO, two or more users in the same cell are co-scheduled on the same time-frequency resource. That is, two or more independent data streams are transmitted to different wireless devices at the same time, and the spatial domain is used to separate the respective streams. By transmitting several streams simultaneously, the capacity of the system can be increased. This however, comes at the cost of reducing the SINR per stream, as the power has to be shared between streams and the streams will cause interference to each-other.

When increasing the antenna array size, the increased beamforming gain will lead to higher SINR, however, as the user throughput depends only logarithmically on the SINR (for large SINRs), it is instead beneficial to trade the gains in SINR for a multiplexing gain, which increases linearly with the number of multiplexed users.

An accurate CSI is desired in order to perform appropriate nullforming between co-scheduled users. In the current LTE Rel.13 standard, no special CSI mode for MU-MIMO exists and thus, MU-MIMO scheduling and precoder construction has to be based on the existing CSI reporting designed for single-user MIMO (that is, a PMI indicating a DFT-based precoder, a RI and a CQI). This may prove quite challenging for MU-MIMO, as the reported precoder only contains information about the strongest channel direction for a user and may thus not contain enough information to do proper null-forming, which may lead to a large amount of interference between co-scheduled users, reducing the benefit of MU-MIMO.

SUMMARY

Some embodiments advantageously provide methods, wireless devices and network nodes for determining multi-beam channel state information, CSI. According to one aspect, embodiments include a method of determining multi-beam channel state information, CSI. The method includes generating a first CSI report associated with a first beam; and generating a second CSI report associated with a second beam, the second CSI report including at least a co-phasing coefficient between the first and second beams.

According to this aspect, in some embodiments, the method further includes selecting the first and second beams according to a subband. In some embodiments, the first beam provides greater signal power to a wireless device 16 than the second beam. In some embodiments, each of the first and second CSI reports includes at least a sub-precoder indicator. In some embodiments, the first CSI report includes a first sub-precoder, the second CSI report includes a second sub-precoder and a linear combination of the first and second sub-precoders has a channel estimation accuracy exceeding a channel estimation accuracy of any one of the first and second sub-precoders. In some embodiments, each of the first and second beams has associated an ordered set of complex numbers, each complex number mapped to an antenna port of an antenna array. In some embodiments, a phase difference between any two complex numbers associated with two adjacent antenna ports is a constant.

In some embodiments, the co-phasing coefficient is a complex number. In some embodiments, each beam of the first beam (128) and second beams is a kth beam, d(k), that has associated a set of complex numbers and has index pair $(l_k, m_k)$, each element of the set of complex numbers being characterized by at least one complex phase shift such that:
$d_n(k) = d_i(k)\alpha_{i,n} e^{j2\pi(p\Delta_{1,k} + q\Delta_{2,k})}$;
$d_n(k)$, and $d_i(k)$ are the $i^{th}$ and $n^{th}$ elements of d(k), respectively;
$\alpha_{i,n}$ is a real number corresponding to the $i^{th}$ and $n^{th}$ elements of d(k);
p and q are integers;
beam directions $\Delta_{1,k}$ and $\Delta_{2,k}$ are real numbers corresponding to beams with index pair $(l_k, m_k)$ that determine the complex phase shifts $e^{j2\pi\Delta_{1,k}}$ and $e^{j2\pi\Delta_{2,k}}$ respectively; and
each of the at least a co-phasing coefficient between the first and second beam (S130) is a complex number $c_k$ for d(k) that is used to adjust the phase of the $i^{th}$ element of d(k) according to $c_k d_i(k)$.

According to another aspect, in some embodiments, a method in a wireless device of reporting a precoder, W, for a plurality of antenna ports at a network node 14 is provided. In some embodiments, the precoder W is a linear combination of at least a first and a second sub-precoder. The method includes receiving from the network node 14 in a first time instance, a first CSI feedback request requesting CSI feedback. The method also includes reporting a first CSI report identifying the first sub-precoder. The method also includes receiving from the network node in a second time instance, a second CSI feedback request requesting additional CSI feedback, and reporting a second CSI report identifying the second sub-precoder.

According to this aspect, in some embodiments, the at least first and second sub-precoders are determined by the wireless device based on received channel state information reference signals, CSI-RS, in a subframe from the network node. In some embodiments, the CSI-RS are received in a same subframe as the first CSI feedback request. In some embodiments, the first sub-precoder comprises a first orthogonal Discrete Fourier Transform, DFT, beam and the second sub-precoder comprises a second DFT beam. In some embodiments, the first and second sub-precoders are each associated with a first and a second power level, respectively, and the first power level is greater than the second power level. In some embodiments, the first CSI request further includes sending an indicator to indicate whether the CSI request is for a CSI report based on one of a legacy codebook of single DFT beam precoders and a high resolution codebook of multi-beam precoders. In some embodiments, the first and second sub-precoders are identified by a first and a second beam index, respectively. In some embodiments, the first and second CSI reports each identify first and second power levels, respectively. In some embodiments, the first and the second power levels are normalized with respect to the first power level so that the first power level is not explicitly reported in the first CSI report. In some embodiments, the second sub-precoder comprises at least one phasing coefficient for linearly combining the first and the second precoders. In some embodiments, the method further includes reporting a CSI feedback accuracy indicator, CFAI. In some embodiments, the CFAI is reported in the second CSI report and is conditioned on a reconstructed precoder with both the first and the second sub-precoder, wherein the first and second sub-precoders are represented as W(1) and W(2) respectively, and the reconstructed precoder is represented as W=W(1)+W(2). In some embodiments, the precoder W comprises more than two sub-precoders, the second CSI report includes a third sub-precoder. In some embodiments, the precoder W comprises more than two sub-precoders, and a third CSI report identifying a third sub-precoder is transmitted in a third time instance. In some embodiments, the receiving further comprising receiving a third CSI feedback request if the precoder W comprises more than two sub-precoders and indicating to the network node 14 based on the CFAI that additional feedback is desired. In some embodiments, the first CSI report also includes a rank indicator, RI, a channel quality indicator, CQI, conditioned on the first sub-precoder. In some embodiments, the second CSI report includes a channel quality indicator, CQI, conditioned on the reconstructed precoder from the first and the second sub-precoders. In some embodiments, the requested CSI and the precoder, W, can be one of either wideband and subband. In some embodiments, the first CSI report is determined using a codebook of single DFT beam precoders. In some embodiments, sending a CSI request further includes sending an indicator to indicate whether the request is for a CSI report based on one of a codebook of single DFT beam precoders and a codebook of multi-beam precoders.

According to yet another aspect, in some embodiments, a wireless device is configured to determine multi-beam channel state information, CSI. The wireless device includes processing circuitry configured to generate a first and a second CSI reports, the first CSI report associated with a first beam, the second CSI report associated with a second beam, the second CSI report including at least a co-phasing coefficient between the first and second beams. Further, a transceiver is configured to transmit the first and second CSI reports to a network node.

According to this aspect, in some embodiments, the processing circuitry is further configured to select the first and second beams according to a subband. In some embodiments, the first beam provides greater signal power to the wireless device than the second beam. In some embodiments, each of the first and second CSI reports includes at least a precoder indicator. In some embodiments, the first CSI report includes a first sub-precoder, the second CSI report includes a second sub-precoder and a linear combination of the first and second sub-precoders has a channel estimation accuracy exceeding a channel estimation accuracy of any one of the first and second sub-precoders. In some embodiments, each of the first and second beams has associated an ordered set of complex numbers, each complex number mapped to an antenna port of an antenna array. In some embodiments, a phase difference between any two complex numbers associated with two adjacent antenna ports is a constant. In some embodiments, the co-phasing coefficient is a complex number.

In some embodiments, a wireless device is configured to report a precoder W, for a plurality of antenna ports E at a network node, wherein the precoder W is a linear combination of at least a first and a second sub-precoder. The wireless device includes processing circuitry configured to: receive from the network node in a first time instance, a first CSI feedback request requesting CSI feedback; report a first CSI report identifying the first sub-precoder; receive from the network node in a second time instance, a second CSI feedback request requesting additional CSI feedback; and report a second CSI report identifying the second sub-precoder.

In some embodiments, the at least first and second sub-precoders are determined by the wireless device based on received channel state information reference signals, CSI-RS, in a subframe from the network node. In some embodiments, the CSI-RS are received in a same subframe as the first CSI feedback request. In some embodiments, the first sub-precoder comprises a first orthogonal Discrete Fourier Transform, DFT, beam and the second sub-precoder comprises a second DFT beam. In some embodiments, the first and second sub-precoders are each associated with a first and a second power level, respectively, and the first power level is greater than the second power level. In some embodiments, the first CSI request further includes sending an indicator to indicate whether the CSI request is for a CSI report based on one of a legacy codebook of single DFT beam precoders and a high resolution codebook of multi-beam precoders. In some embodiments, the first and second sub-precoders are identified by a first and a second beam index, respectively. In some embodiments, the first and second CSI reports each identify first and second power levels, respectively. In some embodiments, the first and the second power levels are normalized with respect to the first power level so that the first power level is not explicitly reported in the first CSI report. In some embodiments, the second sub-precoder comprises at least one phasing coefficient for linearly combining the first and the second sub-precoders. In some embodiments, the method further includes reporting a CSI feedback accuracy indicator, CFAI. In some embodiments, the CFAI is reported in the second CSI report and is conditioned on a reconstructed precoder with both the first and the second sub-precoders, wherein the first and second sub-precoders are represented as W(1) and W(2) respectively, and the reconstructed precoder is represented as W=W(1)+W(2). In some embodiments, the precoder W comprises more than two sub-precoders, the second CSI report includes a third sub-precoder. In some embodiments, the precoder W comprises more than two sub-precoders, and a third CSI report identifying a third sub-precoder is transmitted in a third time instance. In some embodiments, the receiving further comprising receiving a third CSI feedback request if the precoder W comprises more than two sub-precoders and indicating to the network node based on the CFAI that additional feedback is desired. In some embodiments, the first CSI report also includes a rank indicator, RI, a channel quality indicator, CQI, conditioned on the first sub-precoder. In some embodiments, the second CSI report includes a channel quality indicator, CQI, conditioned on the reconstructed precoder from the first and the second sub-precoders. In some embodiments, the requested CSI and the precoder, W, can be one of either wideband and subband. In some embodiments, the first CSI report is determined using a codebook of single DFT beam precoders. In some embodiments, sending a CSI request further includes sending an indicator to indicate whether the request is for a CSI report based on one of a codebook of single DFT beam precoders and a codebook of multi-beam precoders.

According to a further aspect, in some embodiments, a wireless device is configured to determine multi-beam channel state information, CSI. The wireless device includes a memory module configured to store first and second CSI reports, the first CSI report associated with a first beam, the second CSI report associated with a second beam, the second CSI report including at least a co-phasing coefficient between the first and second beams, The wireless device further includes a CSI report generator module configured to generate the first and second CSI reports; and a transceiver module configured to transmit the first and second CSI reports to a network node.

According to another aspect, in some embodiments, a method in a network node for obtaining a precoder based on information from a wireless device is provided. The method includes transmitting to the wireless device a channel state information-reference signal, CSI-RS, for estimating W. The method includes receiving from the wireless device, multiple precoders W(1), W(2), . . . W(k); and computing a precoder W=W(1)+ . . . +W(k).

According to this aspect, in some embodiments, the method further includes transmitting antenna dimension parameters $N_1$ and $N_2$ and associated DFT beam oversampling factors $O_1$ and $O_2$. In some embodiments, the method further includes transmitting a first CSI feedback request requesting CSI feedback. In some embodiments, the method further includes receiving from the wireless device CSI including a rank indicator, RI, and a channel quality indicator, CQI, conditioned on a first sub-precoder, W(1) and RI. In some embodiments, the method further includes transmitting a second CSI feedback request requesting additional CSI feedback. In some embodiments, the method further includes receiving from the wireless device CSI including a first CSI feedback accuracy indicator, CFAI. In some embodiments, the method further includes determining if additional CSI feedback is desired, and if so, then sending to the wireless device an additional CSI feedback request; and receiving from the wireless device CSI including a next sub-precoder and a second CFAI.

According to another aspect, in some embodiments, a network node for obtaining a precoder based on information from a wireless device is provided. The network node includes a transceiver configured to: transmit to the wireless device a channel state information-reference signal, CSI-RS, for estimating W. The transceiver is also configured to receive from the wireless device, multiple precoders W(1), W(2), . . . W(k). The network node also includes a processor configured to compute a precoder W=W(1)+ . . . +W(k).

In some embodiments, the transceiver is further configured to transmit antenna dimension parameters $N_1$ and $N_2$ and associated DFT beam oversampling factors $O_1$ and $O_2$. In some embodiments, the transceiver is further configured to transmit a first CSI feedback request requesting CSI feedback. In some embodiments, the transceiver is further configured to receive from the wireless device a first CSI report including a rank indicator, RI, and a channel quality indicator, CQI, conditioned on a first precoder, W(1) and RI. In some embodiments, the transceiver is further configured to transmit a second CSI feedback request requesting additional CSI feedback. In some embodiments, the transceiver is further configured to receive from the wireless device a second CSI report including a first CSI feedback accuracy indicator, CFAI. In some embodiments, the network node includes a processor configured to determine if additional CSI feedback is desired, and if so, then: sending to the wireless device an additional CSI feedback request; and receiving from the wireless device an additional CSI report including a next sub-precoder and a next CFAI.

According to yet another aspect, in some embodiments, a network node is configured to obtain a precoder based on information received from a wireless device. The network node includes a memory module configured to store: a channel state information-reference signal, CSI-RS, for estimating W; and multiple sub-precoders, W(1), W(2), . . . W(k). The network node also includes a precoder module configured to compute a precoder W=W(1)+ . . . +W(k); and a transceiver module configured to transmit the CSI-RS to the wireless device and to receive from the wireless device the multiple sub-precoders W(1), . . . W(k).

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
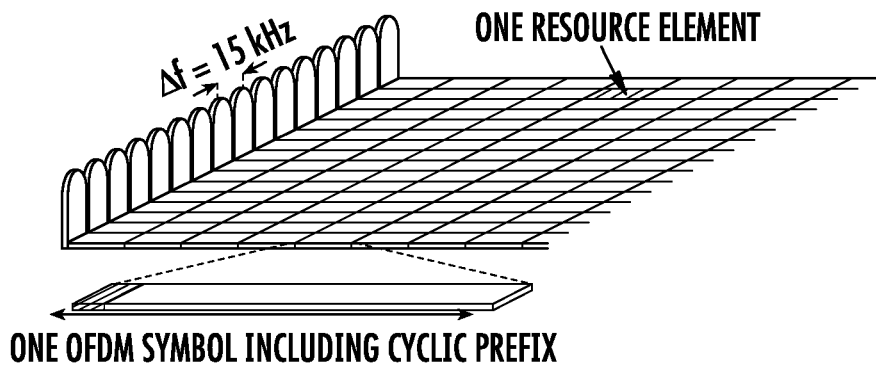
FIG. 1 is a time-frequency grid showing resource elements.
Figure 2:
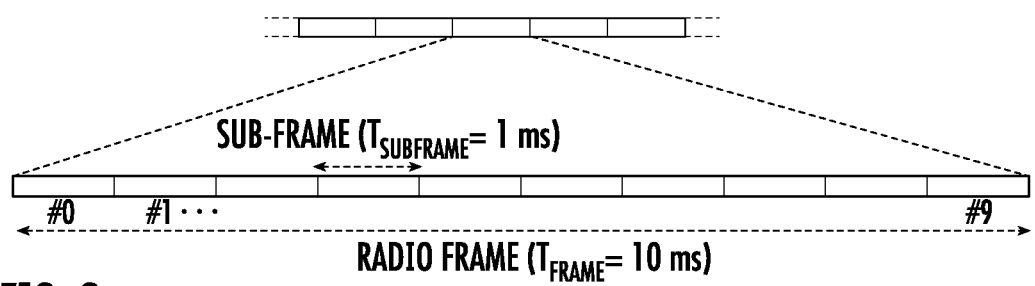
FIG. 2 is a radio frame.
Figure 3:
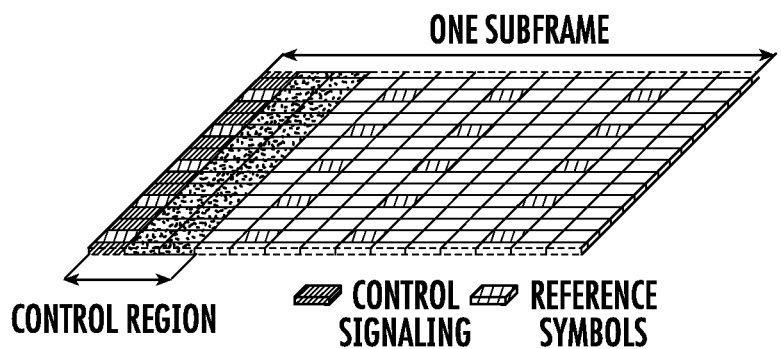
FIG. 3 is a time-frequency grid of resource elements showing 3 OFDM symbols used for control.
Figure 4:
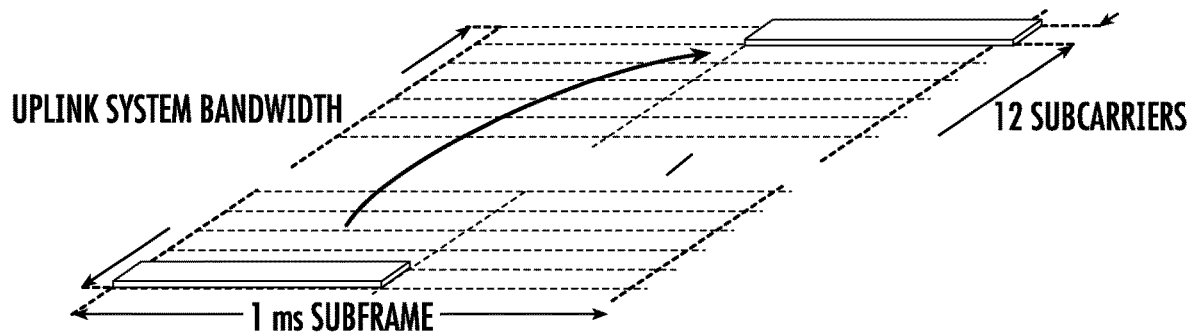
FIG. 4 is a time-frequency grid showing resource blocks assigned for uplink control on the PUCCH.
Figure 5:
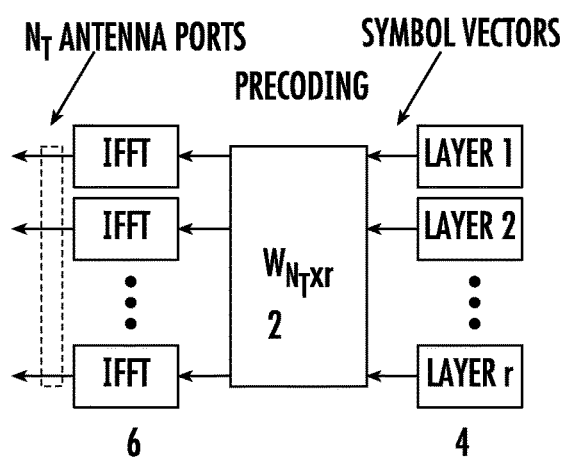
FIG. 5 is a block diagram of a spatial multiplexing operation.
Figure 6:
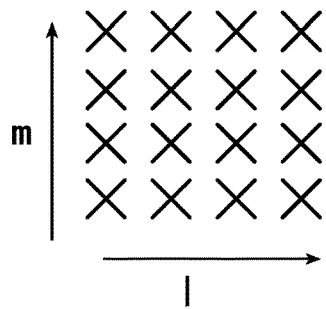
FIG. 6 is a 4×4 antenna array.
Figure 7:
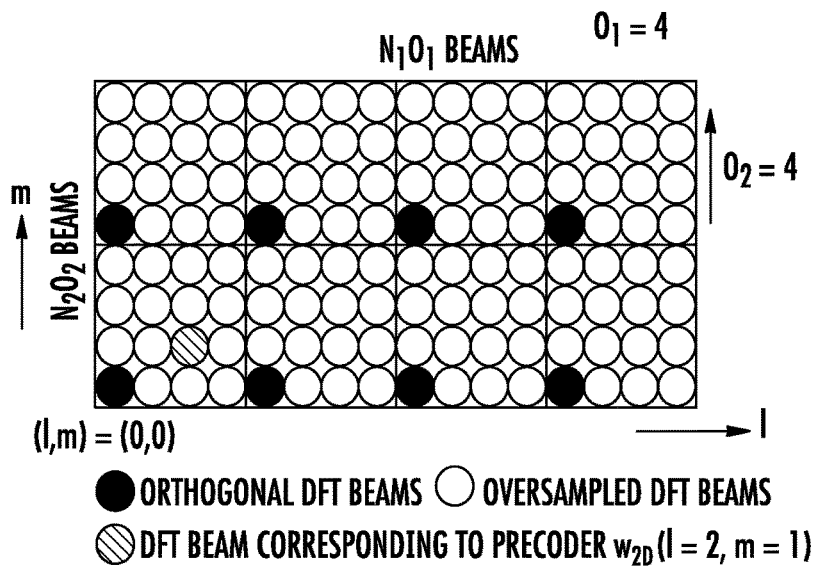
FIG. 7 is a grid of DFT beams.
Figure 8:
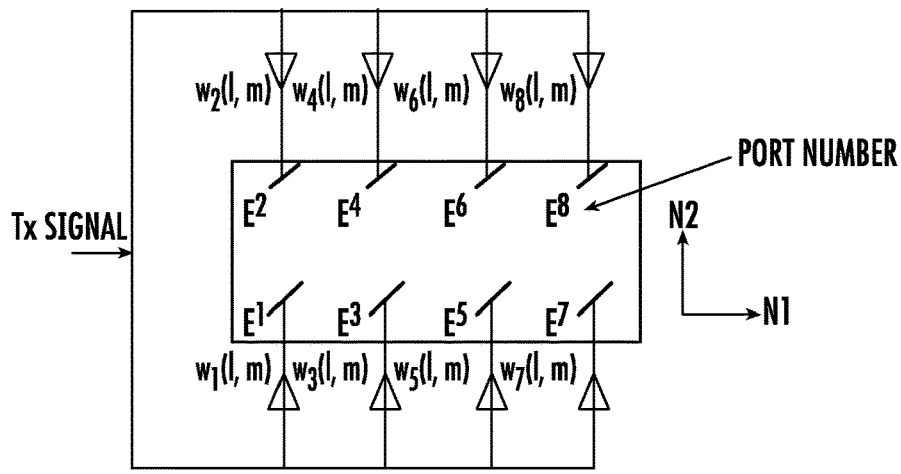
FIG. 8 are antenna port mappings for a single polarization 2D antenna.

Before describing in detail exemplary embodiments, it is noted that the embodiments reside primarily in combinations of apparatus components and processing steps related to progressive advanced channel state information (CSI) feedback and in particular to determining multi-beam CSI. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The term wireless device (WD) used herein may refer to any type of wireless device communicating with a network node and/or with another wireless device in a cellular or mobile communication system. Examples of a wireless device are a user equipment (UE), target device, device to device (D2D) wireless device, machine type wireless device or wireless device capable of machine to machine (M2M) communication, PDA, iPAD, Tablet, mobile terminals, smart phone, laptop embedded equipped (LEE), laptop mounted equipment (LME), USB dongles etc.

The term "network node" used herein may refer to a radio network node or another network node. e.g., a core network node, MSC, MME, O&M, OSS, SON, positioning node (e.g. E-SMLC), MDT node, etc.

The term "radio network node" or "network node" used herein can be any kind of network node comprised in a radio network which may further comprise any of base station (BS), radio base station, base transceiver station (BTS), base station controller (BSC), radio network controller (RNC), evolved Node B (eNB or eNodeB), Node B, multi-standard radio (MSR) radio node such as MSR BS, relay node, donor node controlling relay, radio access point (AP), transmission points, transmission nodes, Remote Radio Unit (RRU) Remote Radio Head (RRH), nodes in distributed antenna system (DAS) etc.

Note further that functions described herein as being performed by a wireless device or a network node may be distributed over a plurality of wireless devices and/or network nodes.

Advanced codebooks comprising precoders with multiple beams have shown to improve MU-MIMO performance due to enhanced null-forming capabilities. Such multi-beam precoders may be defined as follows.

Let $D_N$ be a size N×N DFT matrix, i.e. the elements of $D_N$ are defined as $$[D_N]_{l,m} = \frac{1}{\sqrt{N}} e^{j\frac{2\pi lm}{N}}.$$

Each column of $D_N$ can be used as a precoder for a ULA with N antennas to form a DFT beam. So the N columns of $D_N$ are associated with N orthogonal DFT beams.

These N beams can be rotated to form N new orthogonal beams pointing to slightly different directions. This can be mathematically done by multiplying $D_N$ with a rotation matrix $R_N(q)$ from the left, i.e.

$$D_N(q) = R(q)D_N = [d_1, d_2, \ldots, d_N] \text{ where} \quad \text{Equation 12}$$

$$R_N(q) = \text{diag}\left(\left[ e^{j2\pi \cdot 0 \cdot \frac{q}{N}} \quad e^{j2\pi \cdot 1 \cdot \frac{q}{N}} \quad \ldots \quad e^{j2\pi \cdot (N-1) \cdot \frac{q}{N}} \right]\right)$$

with $0 \le q < 1$.

The amount of rotation is determined by q. In the above equation, the lth rotated DFT beam is given by $d_l$ (l=1, 2 . . . , N).

The beam rotation above can also be used in the more general case of 2D UPAs with ($N_1$, $N_2$) antennas to rotate a set of 2D DFT beams as follows:

$$D_{N_1,N_2}(q_1, q_2) = \quad \text{Equation 13}$$
$$(R_{N_1}(q_1)D_{N_1}) \otimes (R_{N_2}(q_2)D_{N_2}) = [d_1 \quad d_2 \quad \ldots \quad d_{N_1 N_2}]$$

Here, $\{d_i\}_{i=1}^{N_1 N_2}$ are rotated 2D DFT beams and constitutes an orthonormal basis of the vector space $\mathbb{C}^{N_1 N_2}$.

Figures 9, 10:
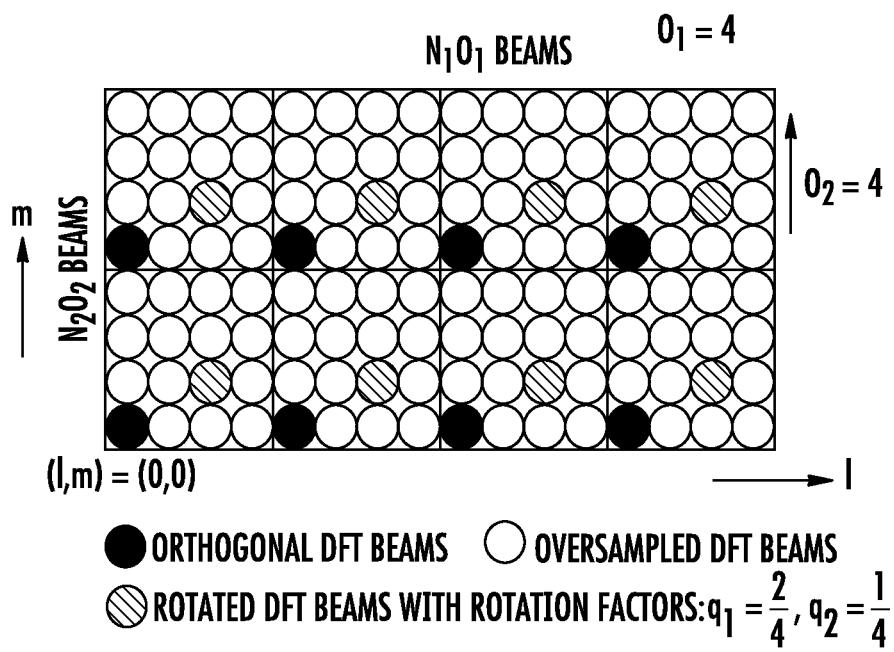
FIG. 9 is an example of feedback precoders for Codebook_config=1 and Codebook_config=2 to 4.
FIG. 10 is a grid of DFT beams.

Note that if a uniform rotation is used between two orthogonal beams, i.e., $q_1 = \frac{i}{Q_1}, i = 0, 1, \ldots, Q_1 - 1,$ $q_2 = \frac{i}{Q_2}, i = 0, 1, \ldots, Q_2 - 1,$ then a rotated beam is equivalent to an oversampled DFT beam with oversampling factors $O_1 = Q_1$ and $O_2 = Q_2$. An example is shown in FIG. 10.

When dual polarizations are used in a 2D UPA, the 2D UPA can be considered as two antenna panels on top of each other, each with a different polarization. The same rotated DFT beams can be applied to both panels. A dual-polarized beam forming matrix can be defined as $$B_{N_1 N_2}(q_1, q_2) = \begin{bmatrix} D_{N_1 N_2}(q_1, q_2) & 0 \\ 0 & D_{N_1 N_2}(q_1, q_2) \end{bmatrix} \quad \text{Equation 14}$$

-continued $$= \begin{bmatrix} d_1 & d_2 & \cdots & d_{N_1 N_2} & 0 & 0 & \cdots & 0 \\ 0 & 0 & \cdots & 0 & d_1 & d_2 & \cdots & d_{N_1 N_2} \end{bmatrix}$$

$$= [\, b_1 \quad b_2 \quad \cdots \quad b_{2N_1 N_2} \,]$$

The columns $(\{b_i\}_{i=1}^{N_1 N_2}$ of $B_{N_1, N_2}(q_1, q_2)$ constitutes an orthonormal basis of the vector space $\mathbb{C}^{2N_1 N_2}$. Such a column $b_i$ is denoted a single-polarized beam (SP-beam) as it is constructed by a beam d transmitted on a single polarization $$\left(\text{i.e. } b = \begin{bmatrix} d \\ 0 \end{bmatrix} \text{ or } b = \begin{bmatrix} 0 \\ d \end{bmatrix}\right).$$

The optimal rank 1 precoder for a wireless device can be expressed as $$W = \sum_{i=1}^{2N_1 N_2} c_i b_i \qquad \text{Equation 15}$$

Where $c_i$ is the complex coefficient associated to the $i^{th}$ beam. Under the assumption that the channel is somewhat sparse, most of the channel energy is contained in a few of the beams. So it is sufficient to describe the precoder by a few of the beams, which keeps down the feedback overhead. Assuming K SP-beams $\{b_{s_1}, b_{s_2}, \ldots, b_{s_K}\}$ are selected from the $2N_1 N_2$ SP-beams, where $s_k \in (1, 2, \ldots, 2N_1 N_2)$, then $$W = [\, b_{s_1} \quad b_{s_2} \quad \cdots \quad b_{s_K} \,] \begin{bmatrix} c_{s_1} \\ c_{s_2} \\ \vdots \\ c_{s_K} \end{bmatrix} = \sum_{i=1}^{K} c_{s_i} b_{s_i} \qquad \text{Equation 16}$$

Generally for the case of rank=R, we have $$W^{(R)} = [\, b_{s_1} \quad b_{s_2} \quad \cdots \quad b_{s_K} \,] \begin{bmatrix} c_{s_1}^{(1)} & \cdots & c_{s_2}^{(R)} \\ c_{s_2}^{(2)} & \cdots & c_{s_2}^{(R)} \\ \vdots & \cdots & \vdots \\ c_{s_K}^{(1)} & \cdots & c_{s_K}^{(R)} \end{bmatrix} \qquad \text{Equation 17}$$

Where $W^{(R)}$ indicates the precoder with rank=R, $c_{s_i}^{(r)}$ (r=1, . . . , R) is the coefficient for beam $b_{s_i}$ and layer r. We can describe the rank R precoder $W^{(R)}$ in the equation above for a given layer r as a linear combination of beams constructed by co-phasing a $k^{th}$ beam $b_{s_k}$ with a co-phasing coefficient $c_{s_i}^{(r)}$. Such a beam co-phasing coefficient is a complex scalar that adjusts at least the phase of a beam relative to other beams. When a beam co-phasing coefficient only adjusts relative phase, it is a unit magnitude complex number.

A more refined multi-beam precoder structure is achieved by separating the complex coefficients into a power (or amplitude) and a phase part, i.e. $c_{s_i}^{(r)} = \sqrt{p_i} e^{j\alpha_i^{(r)}}$, as follows:

$$W^{(R)} = [\, b_{s_1} \quad b_{s_2} \quad \cdots \quad b_{s_K} \,] \begin{bmatrix} \sqrt{p_1} & 0 & & \\ 0 & \sqrt{p_2} & \ddots & \\ & & \ddots & 0 \\ & & 0 & \sqrt{p_K} \end{bmatrix} \qquad \text{Equation 18}$$

$$\begin{bmatrix} e^{j\alpha_1^{(1)}} & \cdots & e^{j\alpha_1^{(R)}} \\ e^{j\alpha_2^{(1)}} & \cdots & e^{j\alpha_2^{(R)}} \\ \vdots & \cdots & \vdots \\ e^{j\alpha_K^{(1)}} & \cdots & e^{j\alpha_K^{(R)}} \end{bmatrix}$$

$$= B_s \sqrt{P} \begin{bmatrix} e^{j\alpha_1^{(1)}} & \cdots & e^{j\alpha_1^{(R)}} \\ e^{j\alpha_2^{(1)}} & \cdots & e^{j\alpha_2^{(R)}} \\ \vdots & \cdots & \vdots \\ e^{j\alpha_K^{(1)}} & \cdots & e^{j\alpha_K^{(R)}} \end{bmatrix}$$

Where $B_s = [\, b_{s_1} \quad b_{s_2} \quad \cdots \quad b_{s_K} \,]$, $$\sqrt{P} = \begin{bmatrix} \sqrt{p_1} & 0 & & \\ 0 & \sqrt{p_2} & \ddots & \\ & & \ddots & 0 \\ & & 0 & \sqrt{p_K} \end{bmatrix}.$$

Letting $$W_1^{(R)} = B_s \sqrt{P} \text{ and } W_2^{(R)} = \begin{bmatrix} e^{j\alpha_1^{(1)}} & \cdots & e^{j\alpha_1^{(R)}} \\ e^{j\alpha_2^{(1)}} & \cdots & e^{j\alpha_2^{(R)}} \\ \vdots & \cdots & \vdots \\ e^{j\alpha_K^{(1)}} & \cdots & e^{j\alpha_K^{(R)}} \end{bmatrix},$$

the precoder may then be expressed as $W^{(R)} = W_1^{(R)} W_2^{(R)}$. The selection of $W_1^{(R)}$ may then be made on a wideband basis while the selection of $W_2^{(R)}$ may be made on a subband basis. The precoder vector for subband f may be expressed as $W^{(R)}(f) = W_1^{(R)} W_2^{(R)}(f)$. That is, only $W_2^{(R)}$ is a function of the subband index f. For simplicity, the superscript r and subband variable f are omitted in the following sections.

As multiplying the precoder vector W with a complex constant C does not change its beamforming properties (as only the phase and amplitude relative to the other single-polarized beams is of importance), one may without loss of generality assume that the coefficients corresponding to e.g. SP-beam 1 is fixed to $p_1 = 1$ and $e^{j\alpha_1} = 1$, so that parameters for one less beam needs to be signaled from the wireless device to the base station. Furthermore, the precoder may be further assumed to be multiplied with a normalization factor, so that, e.g., a sum power constraint is fulfilled, i.e. that $\|w\|^2 = 1$.

What needs to be fed back by the wireless device to the base station is thus

The chosen K SP-beams $\{b_{s_1}, b_{s_2}, \ldots, b_{s_K}\}$. This requires at most K $\log_2 2N_1 N_2$ bits.

The DFT basis rotation factors $q_1$ and $q_2$. For instance, $$q_1(i) = \frac{i}{Q_1}, i = 0, 1, \ldots, Q_1 - 1,$$

$$q_2(i) = \frac{i}{Q_2}, i = 0, 1, \ldots, Q_2 - 1$$

for some value of $Q_1$ and $Q_2$. The corresponding overhead would then be $\log_2 Q_1 Q_2$ bits.

The (relative) power levels $\{\sqrt{p_2}, \sqrt{p_3}, \ldots, \sqrt{p_K}\}$ of the SP-beams. If $Q_p$ is the number of possible discrete power levels, $(K-1)\cdot\log_2 Q_p$ bits are needed to feed back the SP-beam power levels.

The co-phasing factors $\{e^{j\alpha_2}, e^{j\alpha_3}, \ldots, e^{j\alpha_K}\}$ of the SP-beams. For instance, $$\alpha(k) = \frac{2\pi k}{Q_\alpha}, k = 0, 1, \ldots Q_\alpha - 1,$$

for some value of $Q_\alpha$. The corresponding overhead would be $(K-1)\cdot\log_2 Q_\alpha$ bits are needed per rank.

In another scenario, the beams are selected in pairs, i.e. the same K beams are selected from each polarization. i.e.

$$b_{s_i} = \begin{bmatrix} d_{s_i} \\ 0 \end{bmatrix} (i = 1, 2, \ldots, K) \text{ and } b_{s_i} = \begin{bmatrix} 0 \\ d_{s_i} \end{bmatrix} (i = k+1, \ldots, 2K).$$

In this case, $$W^{(R)} = [b_{s_1} \; b_{s_2} \; \ldots \; b_{s_{2K}}] \begin{bmatrix} \sqrt{p_1} & 0 & & \\ 0 & \sqrt{p_2} & \ddots & \\ & & \ddots & 0 \\ & & 0 & \sqrt{p_{2K}} \end{bmatrix} \quad \text{Equation 19}$$

$$\begin{bmatrix} e^{j\alpha_1^{(1)}} & \ldots & e^{j\alpha_1^{(R)}} \\ e^{j\alpha_2^{(1)}} & \ldots & e^{j\alpha_2^{(R)}} \\ \vdots & \ldots & \vdots \\ e^{j\alpha_{2K}^{(1)}} & \ldots & e^{j\alpha_{2K}^{(R)}} \end{bmatrix} =$$

$$B_s \sqrt{P} \begin{bmatrix} e^{j\alpha_1^{(1)}} & \ldots & e^{j\alpha_1^{(R)}} \\ e^{j\alpha_2^{(1)}} & \ldots & e^{j\alpha_2^{(R)}} \\ \vdots & \ldots & \vdots \\ e^{j\alpha_{2K}^{(1)}} & \ldots & e^{j\alpha_{2K}^{(R)}} \end{bmatrix} = W_1^{(R)} W_2^{(R)}$$

where $B_s = [b_{s_1} \; b_{s_2} \; \ldots \; b_{s_{2K}}]$, $$\sqrt{P} = \begin{bmatrix} \sqrt{p_1} & 0 & & \\ 0 & \sqrt{p_2} & \ddots & \\ & & \ddots & 0 \\ & & 0 & \sqrt{p_{2K}} \end{bmatrix},$$

$$W_1^{(R)} = B_s \sqrt{P} \text{ and } W_2^{(R)} = \begin{bmatrix} e^{j\alpha_1^{(1)}} & \ldots & e^{j\alpha_1^{(R)}} \\ e^{j\alpha_2^{(1)}} & \ldots & e^{j\alpha_2^{(R)}} \\ \vdots & \ldots & \vdots \\ e^{j\alpha_{2K}^{(1)}} & \ldots & e^{j\alpha_{2K}^{(R)}} \end{bmatrix},$$

The feedback information then includes:

The chosen K orthogonal beams $b_{s_1}, b_{s_2}, \ldots, b_{s_K}$). This requires at most $K \log_2 N_1 N_2$ bits.

The DFT basis rotation factors $q_1$ and $q_2$. For instance, $$q_1(i) = \frac{i}{Q_1}, i = 0, 1, \ldots, Q_1 - 1,$$

$$q_2(i) = \frac{i}{Q_2}, i = 0, 1, \ldots, Q_2 - 1$$

for some value of $Q_1$ and $Q_2$. The corresponding overhead would then be $\log_2(Q_1 Q_2)$ bits.

The (relative) power levels $\{\sqrt{p_2}, \sqrt{p_3}, \ldots, \sqrt{p_{2K}}\}$. If $Q_p$ is the number of possible discrete power levels, $(2K-1)\cdot\log_2 Q_p$ bits are needed to feed back the power levels.

The co-phasing factors $\{e^{j\alpha_2}, e^{j\alpha_3}, \ldots, e^{j\alpha_{2K}}\}$. For instance, $$\alpha(k) = \frac{2\pi k}{Q_\alpha}, k = 0, 1, \ldots Q_\alpha - 1,$$

for some value of $Q_\alpha$. The corresponding overhead would be $(2K-1)\cdot\log_2 Q_\alpha$ bits are needed per rank.

For an antenna array with 32 antenna ports (e.g. $(N_1, N_2)=(4,4)$) and a system with 10 MHz bandwidth, the total number of bits needed to feedback a multi-beam precoder $W=W_1 W_2$ is about 161 bits with K=3 orthogonal beams at each polarization and $Q_1=Q_2=4$, $Q_p=4$, $Q_\alpha=8$, i.e.

$W_1$:
  K beams: $K \log_2 N_1 N_2 = 3 \log_2 16 = 12$ bits
  DFT beam rotation: $\log_2(Q_1 Q_2) = \log_2 16 = 4$ bits
  Power ratios: $(2K-1) \log_2 Q_p = 5 \log_2 4 = 10$ bits $W_2$:
  Co-phasing factors: $9(2K-1) \log_2 Q_\alpha = 9 \times 5 \log_2 8 = 135$ bits If feedback is configured to happen every 5 ms, then the feedback data rate is equivalent to about 32 kbps per user. This is a very large overhead. Also, for cell edge wireless devices that are power limited, such wireless devices may not be able to transmit such a large payload in one subframe.

Figure 11:
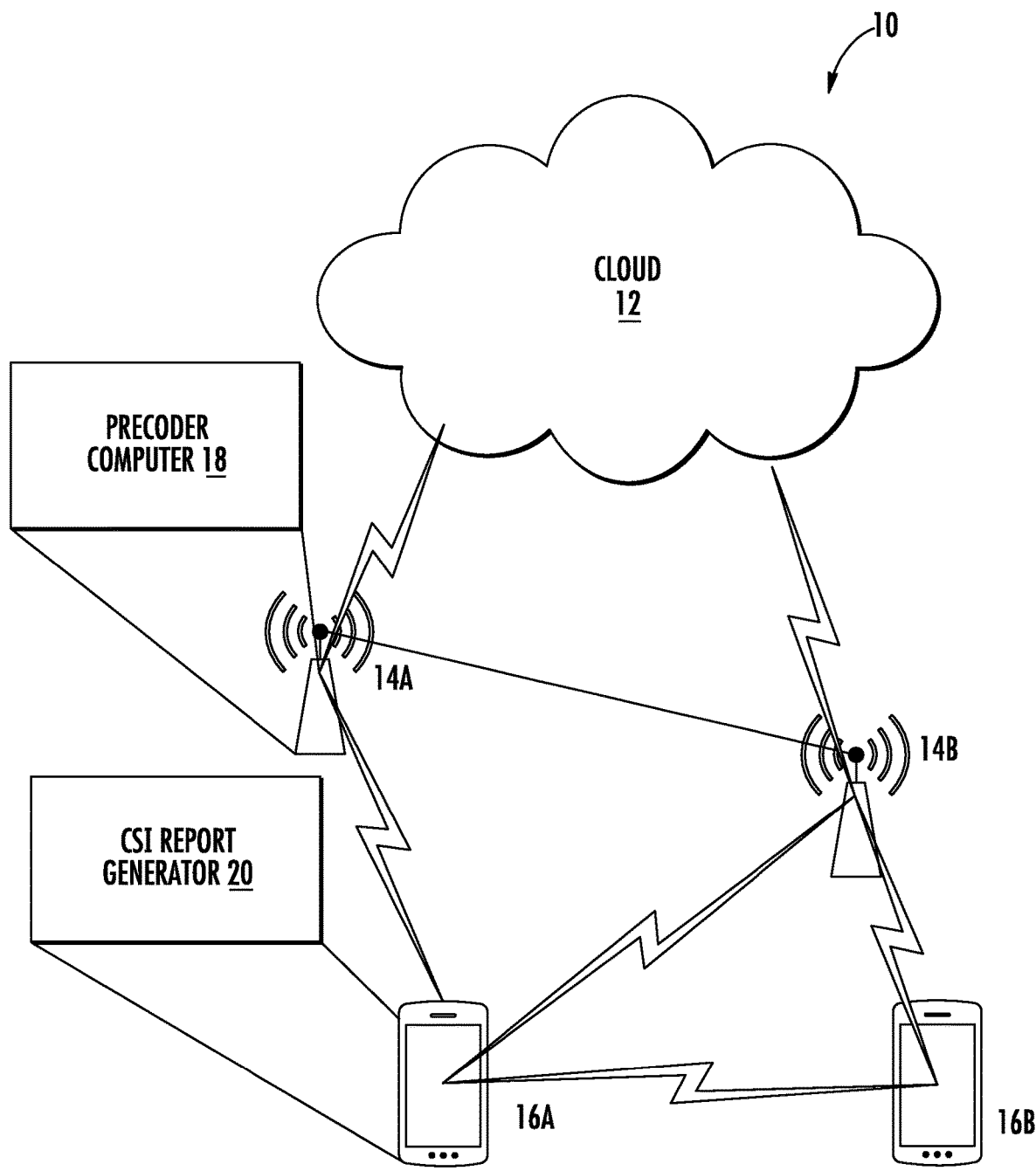
FIG. 11 is a block diagram of a wireless communication system constructed in accordance with principles set forth herein.

Returning to the drawing figures, there is shown in FIG. 11 a block diagram of a wireless communication system 10 configured according to principles set forth herein. The wireless communication network 10 includes a cloud 12 which may include the Internet and/or the public switched telephone network (PSTN). Cloud 12 may also serve as a backhaul network of the wireless communication network 10. The wireless communication network 10 includes one or more network nodes 14A and 141B, which may communicate directly via an X2 interface in LTE embodiments, and are referred to collectively as network nodes 14. It is contemplated that other interface types can be used for communication between network nodes 14 for other communication protocols such as New Radio (NR). The network nodes 14 may serve wireless devices 16A and 16B, referred to collectively herein as wireless devices 16. Note that, although only two wireless devices 16 and two network nodes 14 are shown for convenience, the wireless communication network 10 may typically include many more wireless devices (WDs) 16 and network nodes 14. Further, in some embodiments, WDs 16 may communicate directly using what is sometimes referred to as a side link connection or D2D communication.

Figure 12:
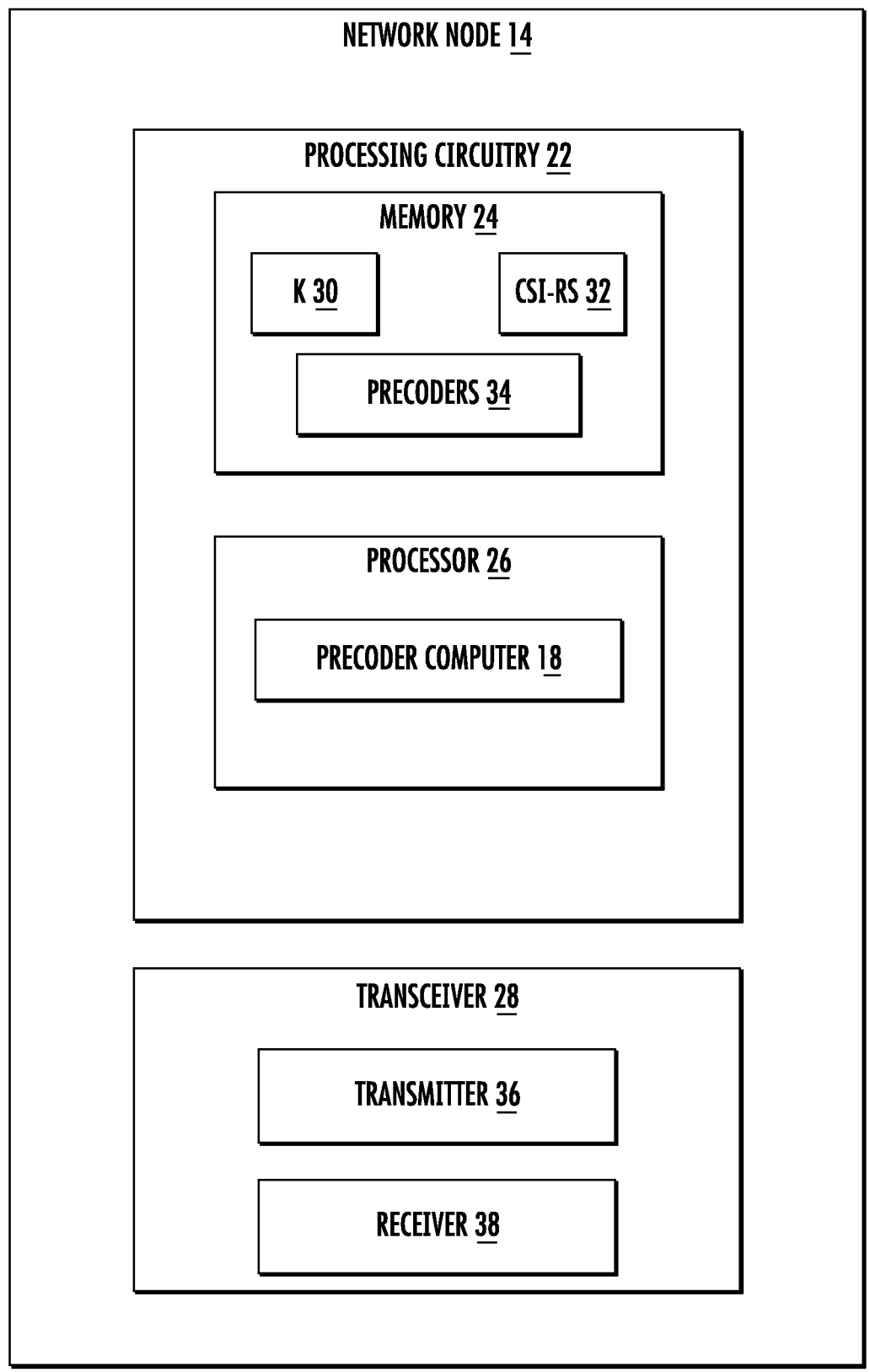
FIG. 12 is a block diagram of a network node.

FIG. 12 is a block diagram of a network node 14, such as a base station or eNB, configured to obtain a precoder based on information from a wireless device 16. The network node 14 has processing circuitry 22. In some embodiments, the processing circuitry may include a memory 24 and processor 26, the memory 24 containing instructions which, when executed by the processor 26, configure processor 26 to perform the functions described herein for obtaining a precoder based on information from a wireless device 16. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may comprise and/or be connected to and/or be configured for accessing (e.g., writing to and/or reading from) memory 24, which may comprise any kind of volatile and/or non-volatile memory. e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

In one embodiment, the memory 24 is configured to store a number of beams, K, 30 used to represent a precoder W. The memory 24 is also configured to store a channel state information-reference symbol, CSI-RS, 32 for estimating W, and multiple sub-precoders, W(1), . . . W(k), 34. The processor 26 is in communication with the memory 24 and configured to implement a precoder computer 18 to compute a precoder W=W(1)+ . . . +W(k). The transceiver 28 is in communication with the processor 26 and is configured to transmit K and the CSI-RS to the wireless device 16 and to receive from the wireless device 16 the multiple sub-precoders W(1), . . . W(k). Although shown as a single integrated transmitter/receiver unit designated as a "transceiver" it is understood that implementations using a separate transmitter 36 and receiver 38 can be made and that embodiments are not limited to a single combined transmitter/receiver.

Figure 13:
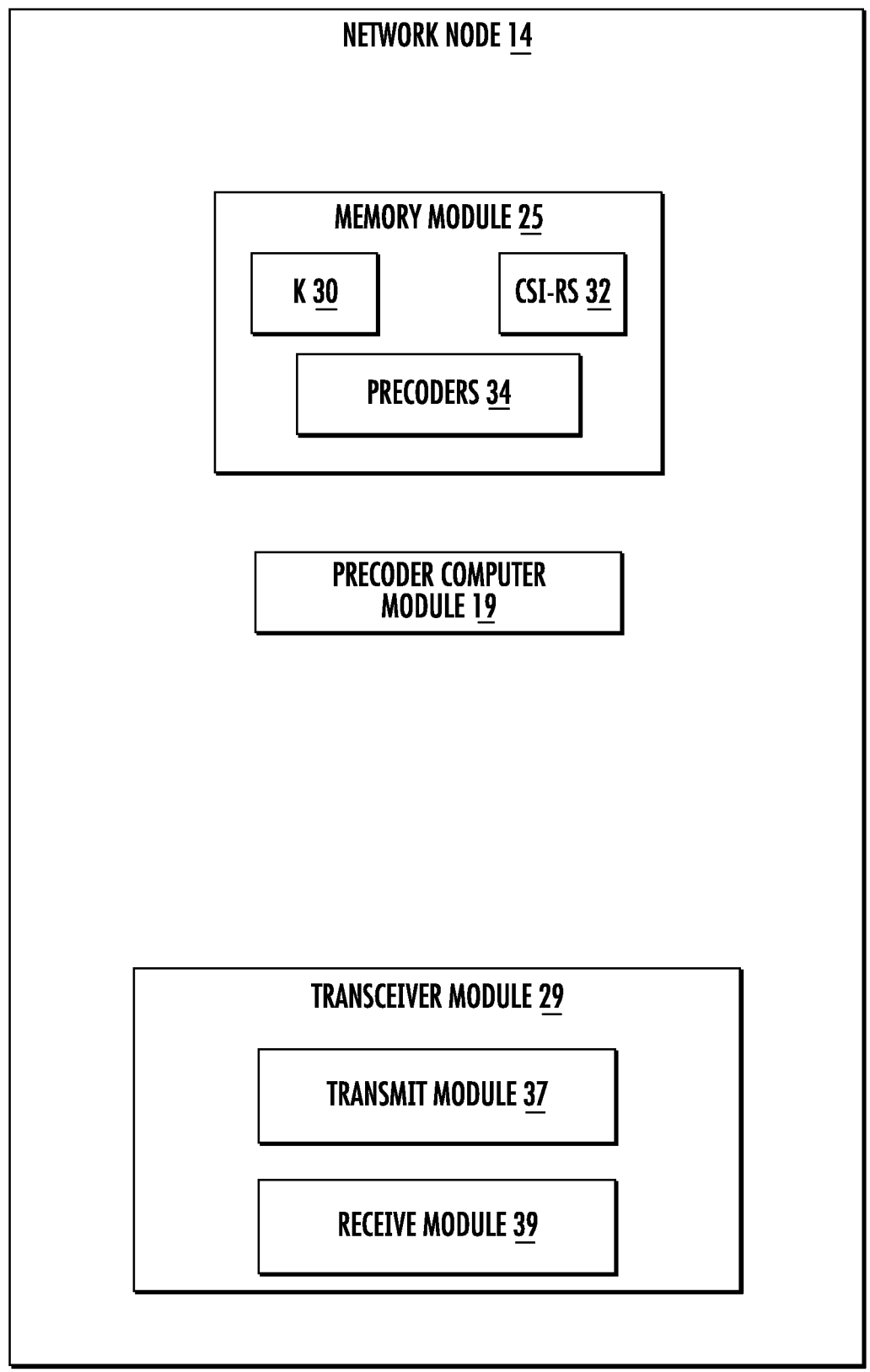
FIG. 13 is a block diagram of an alternative embodiment of a network node.

FIG. 13 is a block diagram of an alternative embodiment of the network node 14 having modules that include a memory module 25, a precoder computer module 19 and a transceiver module 29. In one embodiment, the precoder computer module 19 and at least some of the transceiver module 29 may be implemented as software executable by a computer processor. The memory module 25, the precoder computer module 19 and transceiver module 29 may perform the same functions as memory 24, precoder computer 18 and transceiver 28, respectively. The transceiver module 29 includes a transmit module 37 and a receive module 39. The modules in FIG. 13 may be implemented at least in part as software modules having software that when executed by a processor perform the function ascribed to the modules.

In one embodiment, the network node 14 is configured to obtain a precoder based on information from a wireless device 16 by executing software in a processor. In some embodiments, the memory module 25 is configured to store a channel state information-reference symbol, CSI-RS. 32 for estimating W and at least one precoder W 34. The transceiver module 29 is configured to transmit to the wireless device 16 a CSI reference signal, CSI-RS, in a subframe for estimating W=W(1)+W(2)+ . . . +W(K), and W(k) is a sub-precoder associated with a kth selected beam. The transceiver module 29 is configured to send by the network node 14 to the wireless device 16, a first CSI feedback request requesting CSI feedback. The transceiver module 29 is configured to receive from the wireless device 16, CSI including a first sub-precoder W(1), a rank indicator, RI, and a channel quality indicator, CQI, conditioned on W(1) and RI. The transceiver module 29 is configured to send by the network node 14 to the wireless device 16, a second CSI feedback request requesting additional CSI feedback. The transceiver module 29 is configured to receive from the wireless device 16, CSI including a second sub-precoder W(2) and a CSI feedback accuracy indicator, CFAI. The precoder module 19 is configured to determine at the network node 14 whether additional CSI feedback is desired based on the CFAI. If additional CSI feedback is desired: the transceiver module 29 is configured to send to the wireless device 16 an additional CSI feedback request; and the transceiver module 29 is configured to receive from the wireless device 16 CSI including a next sub-precoder, W(k), 2<k and a next CFAI. The precoder module 19 is configured to construct at the network node 14 a precoder W=W(1)+W(2)+ . . . W(k) which provides better performance than any of the sub-precoders, W(1), W(2) . . . W(k), individually.

Figure 14:
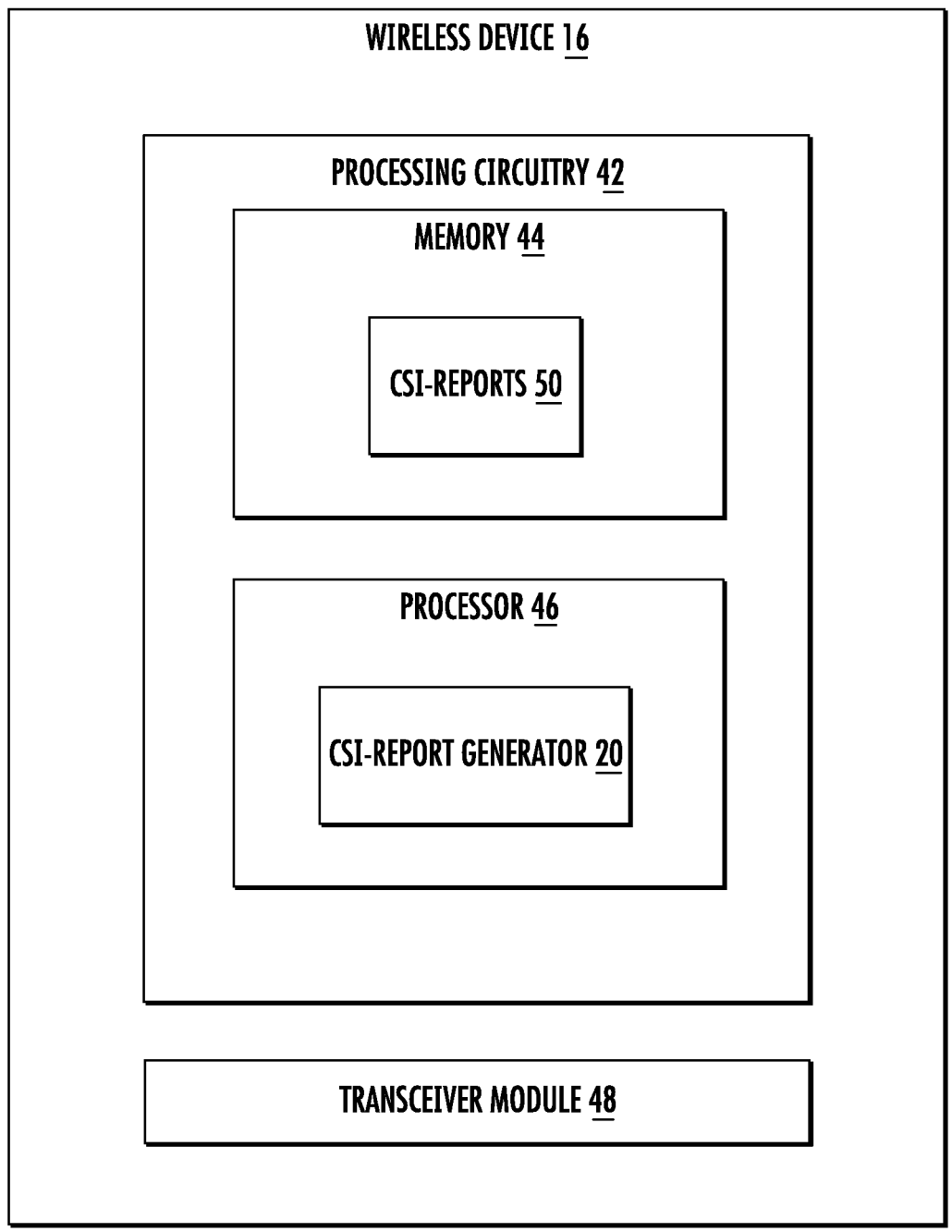
FIG. 14 is a block diagram of a wireless device.

FIG. 14 is a block diagram of an embodiment of a wireless device 16 configured to determine multi-beam channel state information (CSI). The wireless device 16 may include processing circuitry 42 that may include a memory 44 and a processor 46, the memory 44 containing instructions which, when executed by the processor 46, configure processor 46 to perform the functions described herein for obtaining a precoder based on information from a wireless device. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuitry).

Processing circuitry 42 may comprise and/or be connected to and/or be configured for accessing (e.g., writing to and/or reading from) memory 44, which may comprise any kind of volatile and/or non-volatile memory. e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication. e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store CSI reports 50. The processor 46 implements a CSI report generator 20 that generates the CSI reports 50. A transceiver 48 is configured to transmit the CSI reports to a network node 14.

Figure 15:
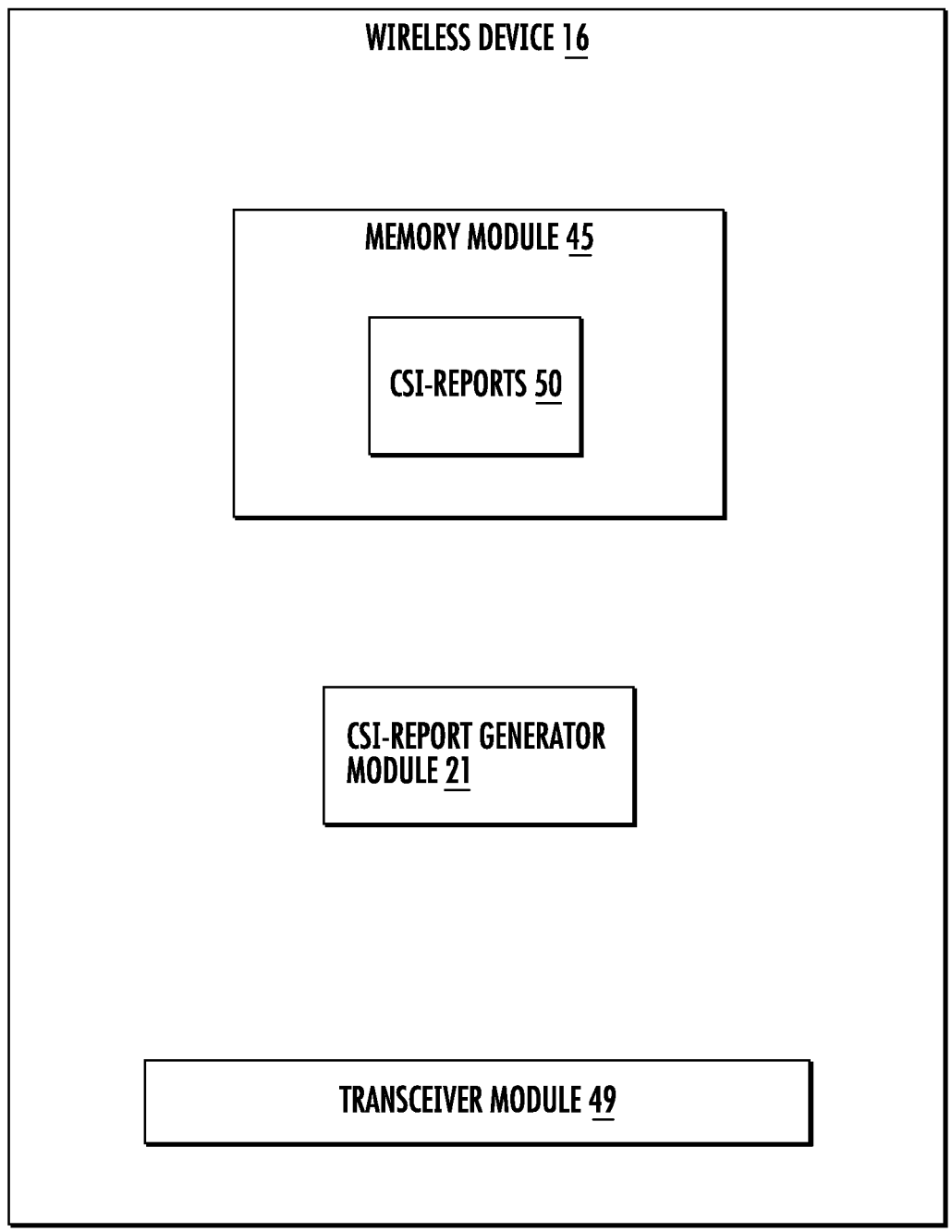
FIG. 15 is a block diagram of an alternative embodiment of a wireless device.

FIG. 15 is a block diagram of an alternative embodiment of the wireless device 16 that includes memory module 45, transceiver module 49 and a CSI report generator module 21. The CSI report generator module 21 and at least some of the transceiver 49 may be implemented as software executable by a computer processor. The memory module 45, transceiver module 49 and CSI report generator module 21 may perform the same functions as memory 44, transceiver 48 and CSI report generator 20, respectively. The modules in FIG. 15 may be implemented at least in part as software modules having software that when executed by a processor perform the function ascribed to the modules.

Figure 16:
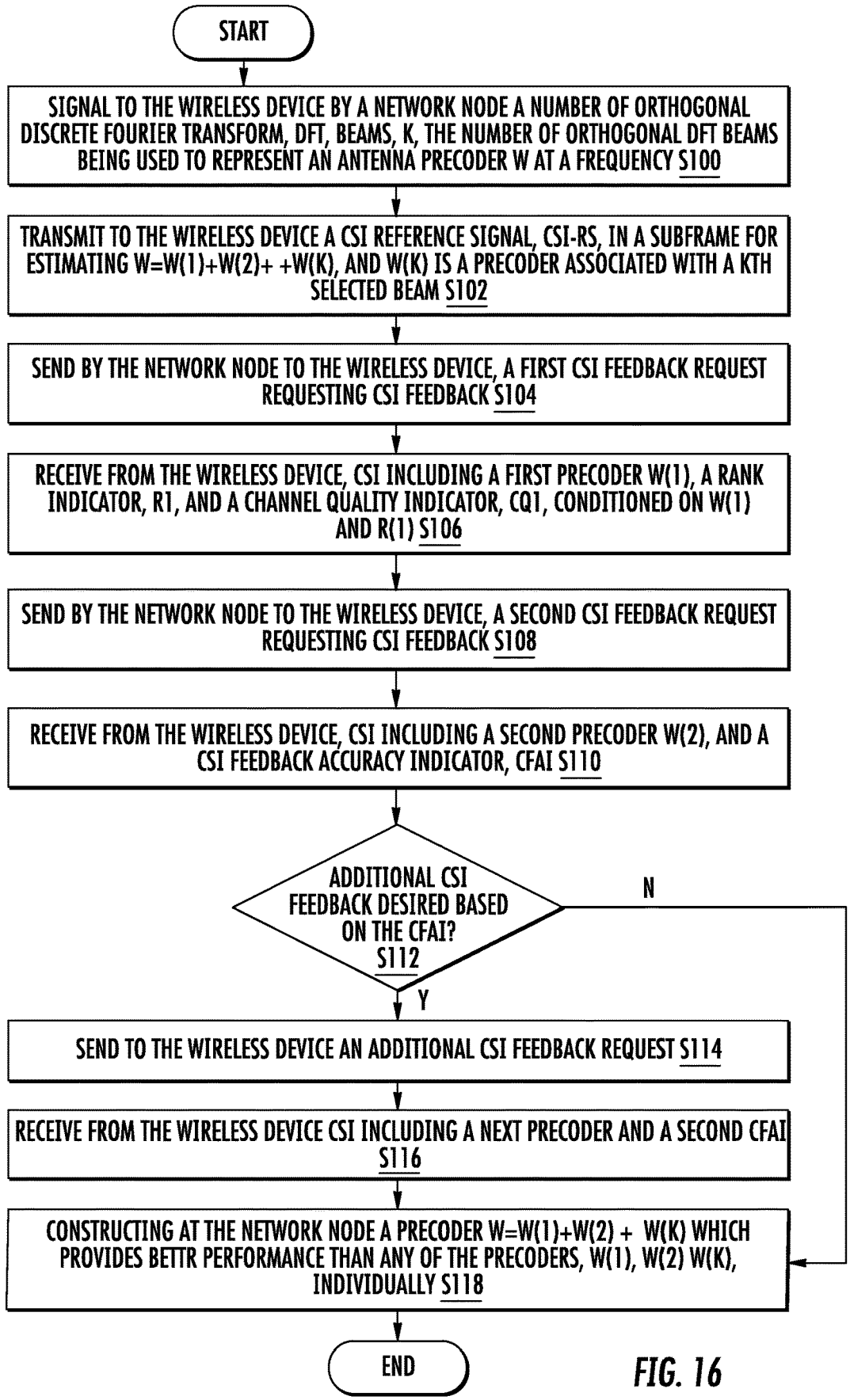
FIG. 16 is a flowchart of an exemplary process of obtaining a precoder based on information from a wireless device.

FIG. 16 is a flowchart of an exemplary process in a network node 14 of obtaining a precoder based on information from a wireless device 16. The process includes transmitting, via the transceiver 28, to the wireless device 16 a CSI reference signal, CSI-RS, in a subframe for estimating W=W(1)+W(2)+ . . . +W(K), and W(k) is a sub-precoder associated with a kth selected beam (block S102). The network node 14 sends, via the transceiver 28, a first CSI feedback request requesting CSI feedback to the wireless device 16 (block S104). The network node 14 receives from the wireless device 16 CSI including a first sub-precoder W(1), a rank indicator, RI, and a channel quality indicator, CQI, conditioned on W(1) and RI (block S106). The process also includes sending by the network node 14 to the wireless device 16, a second CSI feedback request requesting additional CSI feedback (block S108). The process includes receiving from the wireless device 16, CSI including a second sub-precoder W(2) and a CSI feedback accuracy indicator, CFAI (block S110). The process also includes determining at the network node 14 whether additional CSI feedback is desired based on the CFAI (block S112). If additional CSI feedback is desired, the process includes sending via the transceiver 28 to the wireless device 16 an additional CSI feedback request (block S114), and receiving from the wireless device 16, CSI including a next sub-precoder, W(k), 2<k and a next CFAI (block S116). The network node 14 constructs a precoder W=W(1)+W(2)+ . . . W(k) which provides better performance than any of the sub-precoders, W(1), W(2) . . . W(k), individually (block S118).

Figure 17:
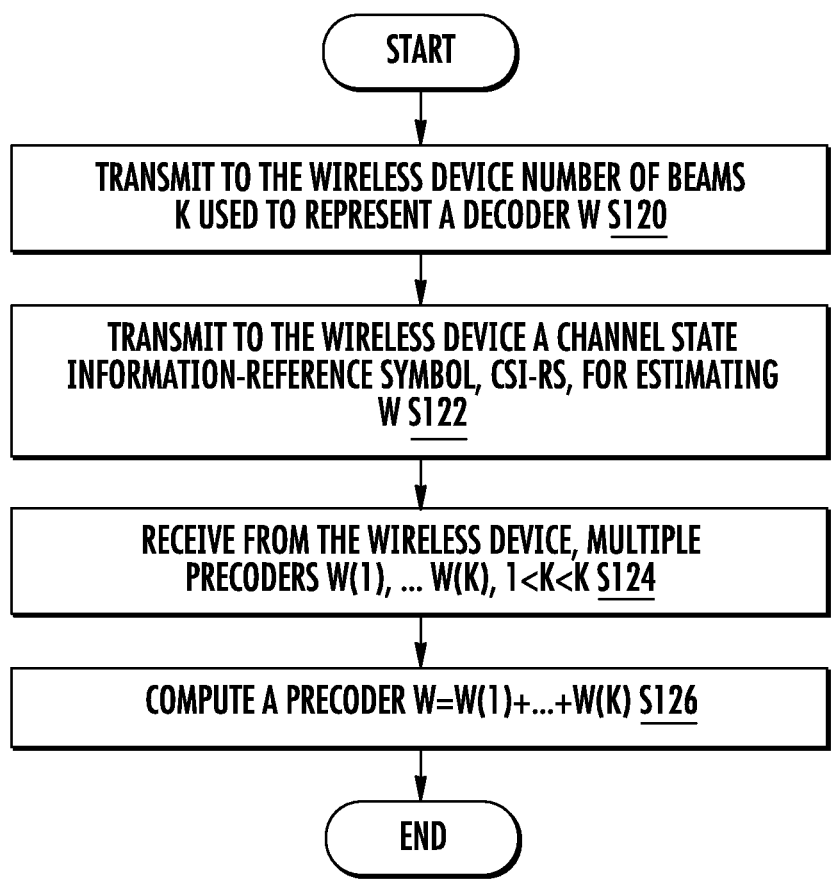
FIG. 17 is a flowchart of an exemplary process in network node of obtaining a precoder based on information from a wireless device.

FIG. 17 is a flowchart of an exemplary process in network node 14 of obtaining a precoder based on information from a wireless device 16. The process includes transmitting via the transceiver 28 to the wireless device 16 a channel state information-reference signal.

CSI-RS. 32 for estimating W (block S122). The process also includes receiving via the receiver 38 from the wireless device 16, multiple sub-precoders W(1), . . . W(k). (block S124). The process also includes computing via the precoder computer 18 a precoder W=W(1)+ . . . +W(k) 34 (block S126).

Figure 18:
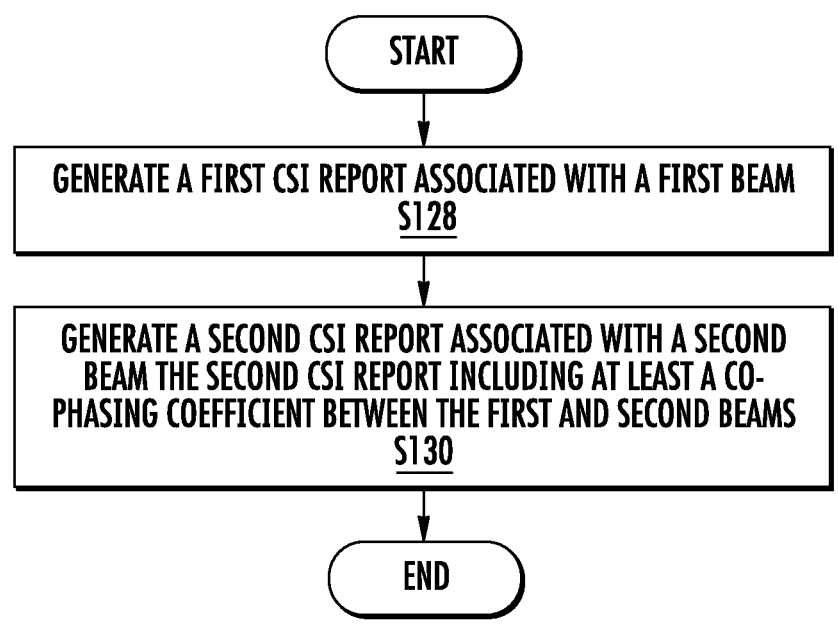
FIG. 18 is a flowchart of an exemplary process for determining multi-beam CSI.

FIG. 18 is a flowchart of an exemplary process in a wireless device 16 for determining multi-beam CSI. The process includes generating, via the CSI report generator 20, a first CSI report associated with a first beam (block S128). The process also includes generating, via the CSI report generator 20 a second CSI report associated with a second beam, the second CSI report including at least a co-phasing coefficient between the first and second beams (block S130).

Figure 19:
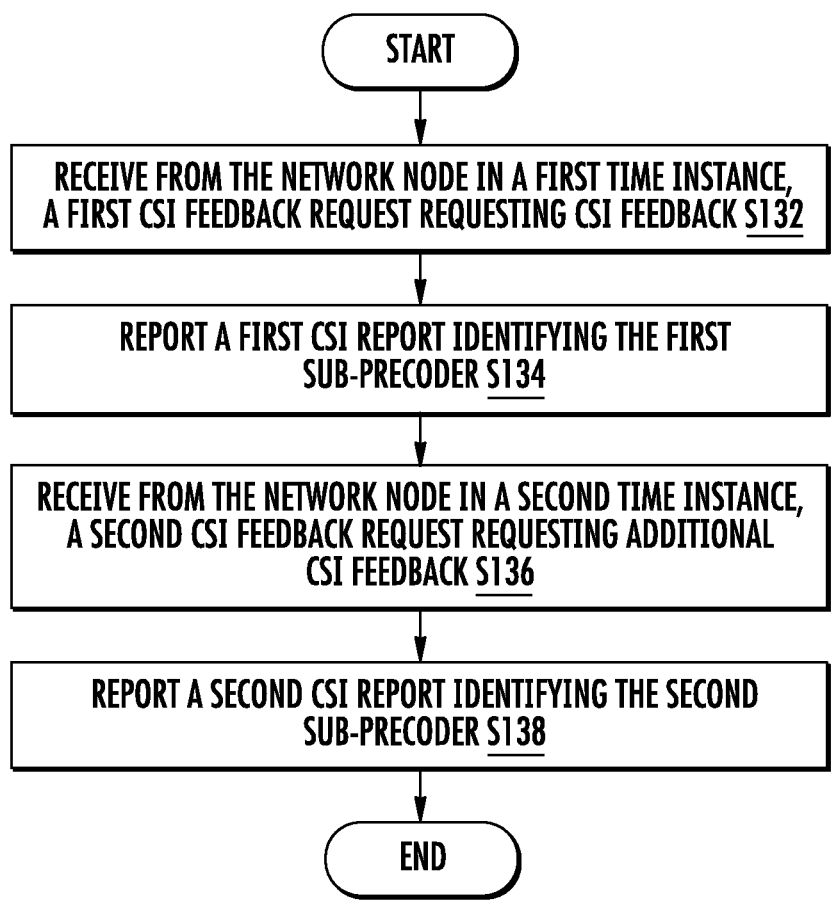
FIG. 19 is a flowchart of an exemplary process for process in a wireless device of reporting a precoder, W, for a plurality of antenna ports at a network node, wherein the precoder W is a linear combination of at least a first and a second sub-precoder.
Figure 20:
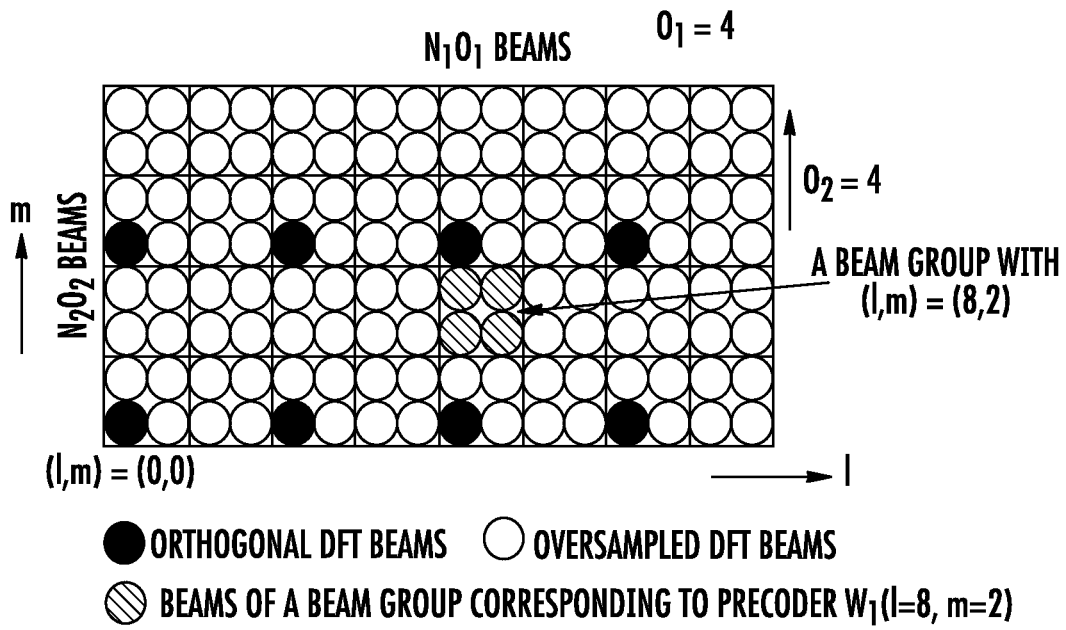
FIG. 20 is a grid of DFT beams.

FIG. 19 is a flowchart of an exemplary process in a wireless device 16 of reporting a precoder, W, for a plurality of antenna ports at a network node 14, wherein the precoder W is a linear combination of at least a first and a second sub-precoder. The process includes receiving via the transceiver 48 from the network node 14 in a first time instance, a first CSI feedback request requesting CSI feedback (block S132). The process includes reporting a first CSI report 50 identifying the first sub-precoder (block S134). The process also includes receiving via the transceiver 48 from the network node 14 in a second time instance, a second CSI feedback request requesting additional CSI feedback (block S136). The process also includes reporting a second CSI report 50 identifying the second sub-precoder (block S138).

A multi-beam precoder is fed back progressively, one sub-precoder (corresponding to one beam) at a time. The network node 14, such as the base station, e.g., eNB, refines the precoder with each newly received sub-precoder. Data can be transmitted with the refined precoder with each new sub-precoder based on the following:
a) Use Rel-13 CSI feedback as the first sub-precoder feedback of advanced CSI report with K beams
b) Rank 1 and rank 2:
   i) Rel-13 $W_1(i_1)$ identifies the principal beam and $W_2(i\_2)$ provides per subband co-phasing between two polarizations on the principal beam
   ii) Amplitude and phase of the remaining K−1 beams can be requested by the base station using aperiodic CSI reporting
      (1) (K−1) can also be signalled
      (2) CQI is also fed back by considering all K beams or the beams reported including the current beams
   iii) Alternatively, the sub-precoder associated with the K−1 remaining beams may be distributed in K−1 aperiodic CSI reports, i.e., one beam per report.
      (1) The beam with highest power is reported first and beam with lowest power is reported last
      (2) The base station may also signal the beam index (associated with rx power, i.e. 0 means principle beam; 1 means beam with $2^{nd}$ highest power; and so on)
      (3) CQI in each report is a result of combining all previously reported beams
      (4) The wireless device 16 may also report a CSI feedback accuracy Indicator (CFAI) in each report, which may be used by the network node 14 to decide whether additional reports for the remaining sub-precoders are needed.
   iv) The base station approximates the channel H or multi-beam precoder based on CSI of currently received beams or sub-precoders
   v) Alternatively, CSI over only particular subbands may be measured and fed back
c) RANK=3 or 4:
   i) In one embodiment, no additional CSI report is triggered when rank>2 is reported Some embodiments have the advantage of:

Feedback overhead saving: feeding back only a coarse CSI when network load is low and/or MU-MIMO opportunity is low Flexibility: CSI with different levels of channel resolution can be reported Less wireless device 16 transmit (Tx) power demand: when the wireless device 16's Tx power is limited, it allows advanced CSI feedback to be done over multiple subframes, thus only a small number of PRBs is needed in each feedback subframe Consider a codebook consisting of multi-beam precoders with the following structure for rank=1 and rank=2:

$$W = W_1 W_2 = \sum_{k=1}^{K} W_1(k) W_2(k) = \sum_{k=1}^{K} W(k) \quad \text{Equation 20}$$

Where $$W_1 = [W_1(1), W_1(2), \ldots, W_1(K)] \quad \text{Equation 21}$$

$$W_1(k) = \begin{bmatrix} d_k & 0 \\ 0 & d'_k \end{bmatrix} \begin{bmatrix} \sqrt{p_k} & 0 \\ 0 & \sqrt{p'_k} \end{bmatrix}, k = 1, 2, \ldots, K. \quad \text{Equation 22}$$

$$W_2 = \begin{bmatrix} W_2(1) \\ W_2(2) \\ \ldots \\ W_2(K) \end{bmatrix} \quad \text{Equation 23}$$

For rank = 1: $W_2(k) = \begin{bmatrix} e^{j\alpha^{(1)}_{2k-1}} \\ e^{j\alpha^{(1)}_{2k}} \end{bmatrix}$, $\quad$ Equation 24

$k = 1, 2, \ldots, K.$

For rank = 2: $W_2(k) = \begin{bmatrix} e^{j\alpha^{(1)}_{2k-1}} & e^{j\alpha^{(2)}_{2k-1}} \\ e^{j\alpha^{(1)}_{2k}} & e^{j\alpha^{(2)}_{2k}} \end{bmatrix}$, $\quad$ Equation 25

$k = 1, 2, \ldots, K.$ $$W(k) = W_1(k) W_2(k), k = 1, 2, \ldots, K. \quad \text{Equation 26}$$

In the above equations, $\{d_k, k=1, 2, \ldots, K\}$ are K orthogonal beams (or single-polarized DFT precoders) with antennas at a first polarization and $\{d'_k, k=1, 2, \ldots, K\}$ are K orthogonal beams (or single-polarized DFT precoders) with antennas at a second polarization. These beams can be selected by a wireless device 16 based on certain criteria. For example, the K beam pairs have the largest received signal powers, among all the beams, at the wireless device 16, i.e. $\max_{\{d_1, \ldots, d_K, d'_1, \ldots, d'_K\}} \sum_{k=1}^{K} \|HW(k)\|^2$, where H is the channel matrix and $\|x\|$ denotes the norm of x, such as the Frobenius norm.

In the following discussions, we assume that $$p_1 \geq p_2 \geq \ldots \geq p_K \text{ or } p_1 + p'_1 \geq p_2 + p'_2 \geq \ldots \geq p_K + p'_K.$$

$$\sqrt{p_k}, \sqrt{p'_k} \in \left\{ \frac{i}{Q_p}, i=0, 1, \ldots, Q_p - 1 \right\},$$

where $Q_p$ is an integer representing the quantization levels. In other words, a wireless device 16 receives maximum power on the beam pair $d_1$ and $d'_1$.

Figure 23:
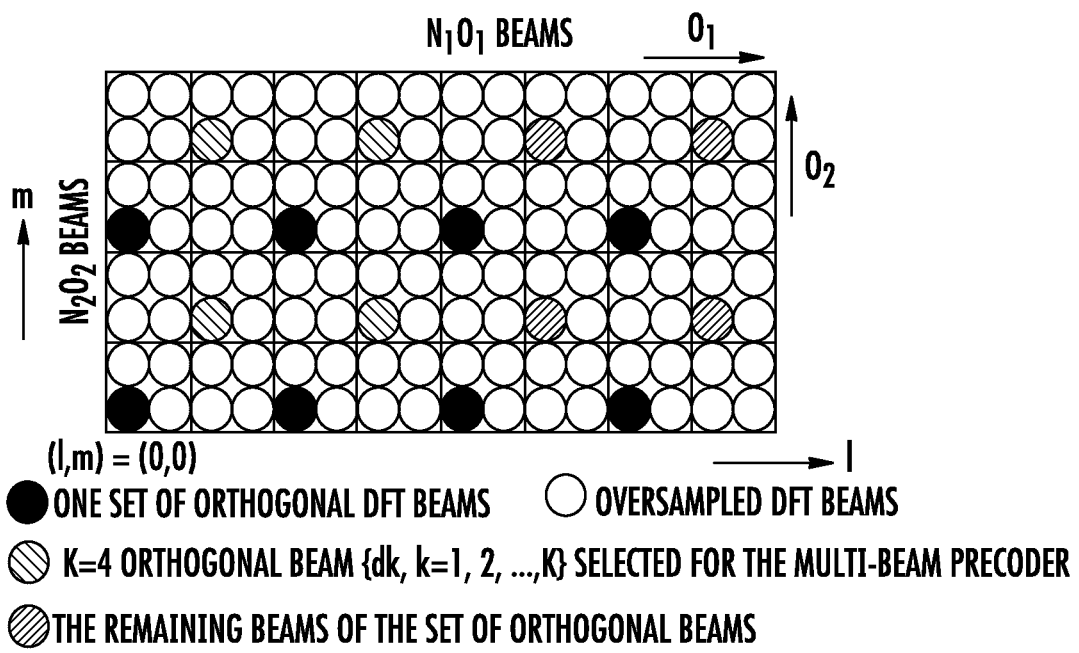
FIG. 23 is a grid of DFT beams.

$\{d_k, k=1, 2, \ldots, K\}$ are K orthogonal DFT beams among the oversampled DFT beams ($v_{l,m}$, $l=0, 1, \ldots, N_1 O_1 - 1$; $m=0, 1, \ldots, N_2 O_2 - 1$), where $O_1 = Q_1$ and $O_2 = Q_2$ are the oversampling factor in dimension $N_1$ and $N_2$, respectively. The definition of $v_{l,m}$ is given below:

$$v_{l,m} = \left[ u_m e^{j\frac{2\pi l}{O_1 N_1}} u_m \ldots e^{j\frac{2\pi l(N_1-1)}{O_1 N_1}} u_m \right]^T \quad \text{Equation 27}$$

where $u_m = \left[ 1 \quad e^{j\frac{2\pi m}{O_2 N_2}} \quad \ldots \quad e^{j\frac{2\pi m(N_2-1)}{O N_2}} \right]^T$ An example is shown in FIG. 23, where $(N_1, N_2) = (4,2)$ and $O_1 = O_2 = 4$, where K=4 beams $\{d_k, k=1, 2, \ldots, K\}$ are selected from a set orthogonal beams.

Similarly, $\{d'_k, k=1, 2, \ldots, K\} \in \{v_{l,m}, l=0, 1, \ldots, N_1 O_1 - 1; m=0, 1, \ldots, N_2 O_2 - 1\}$ are K beams on the second polarization. In one embodiment, $d'_k = d_k$ ($k=1, 2, \ldots, K$), i.e. the same beam is selected for both polarizations. In another embodiment, $d'_k \neq d_k$, i.e. the beams may be selected independently for each polarization.

So, $W_1(k)$ consists of a pair of beams. $(d_k, d'_k)$, one for each antenna polarization, and the associated powers. $W_2(k)$ contains the coefficients associated with the pair of beams, $e^{j\alpha^{(r)}_{2k-1}}$, and $e^{j\alpha^{(r)}_{2k}}$ are the layer r (r=1 for rank=1 and r=1, 2 for rank=2) co-phasing factors associated with beams $d_k$ and $d'_k$, respectively.

$$\alpha^{(r)}_{2k-1}, \alpha^{(r)}_{2k} \in \left\{ \frac{\pi i}{Q_\alpha}, i=0, 1, \ldots, Q_\alpha - 1 \right\} \text{ and } Q_\alpha$$

is an integer representing the phase quantization levels.

$W(k) = W_1(k) W_2(k)$ can be considered as a sub-precoder associated with a beam pair $(d_k, d'_k)$. Thus, feedback of W is equivalent to feedback $\{W(k), k=1, 2, \ldots, K\}$.

In one scenario, referred to here as a "Type A multi-beam Codebook", $\{d_1, d_2, \ldots, d_K\}$ and $(d'_1, d'_2, \ldots, d'_K)$ are common for all subbands, i.e. the same beams are selected for the whole bandwidth. In this case, $W_1(k)$ is reported for wideband (i.e. the whole bandwidth) while $W_2(k)$ is reported per subband.

Figure 21:
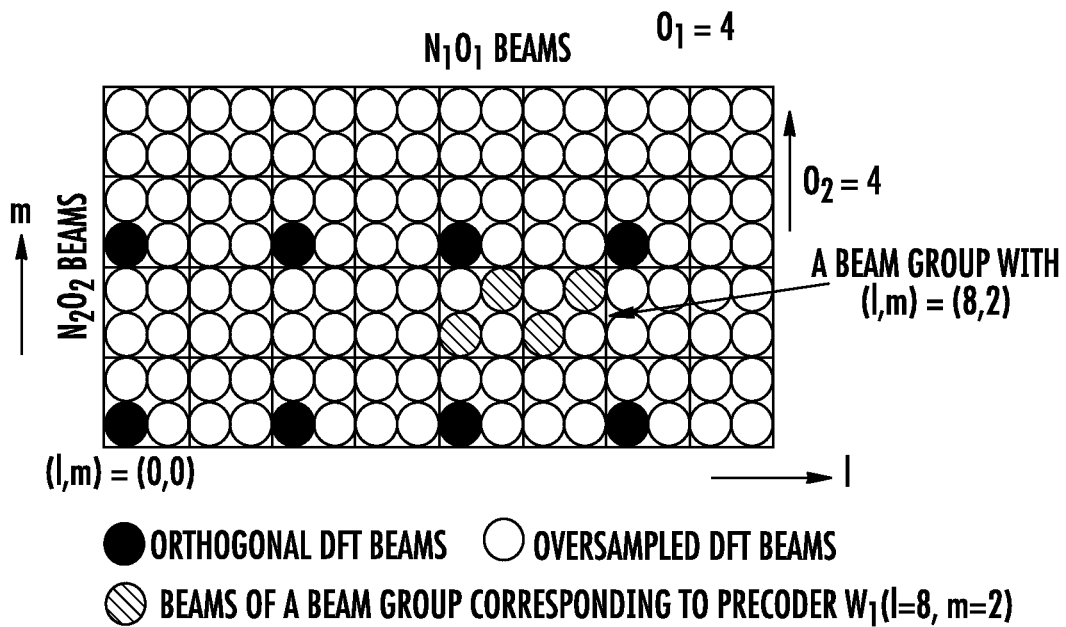
FIG. 21 is a grid of DFT beams.
Figure 22:
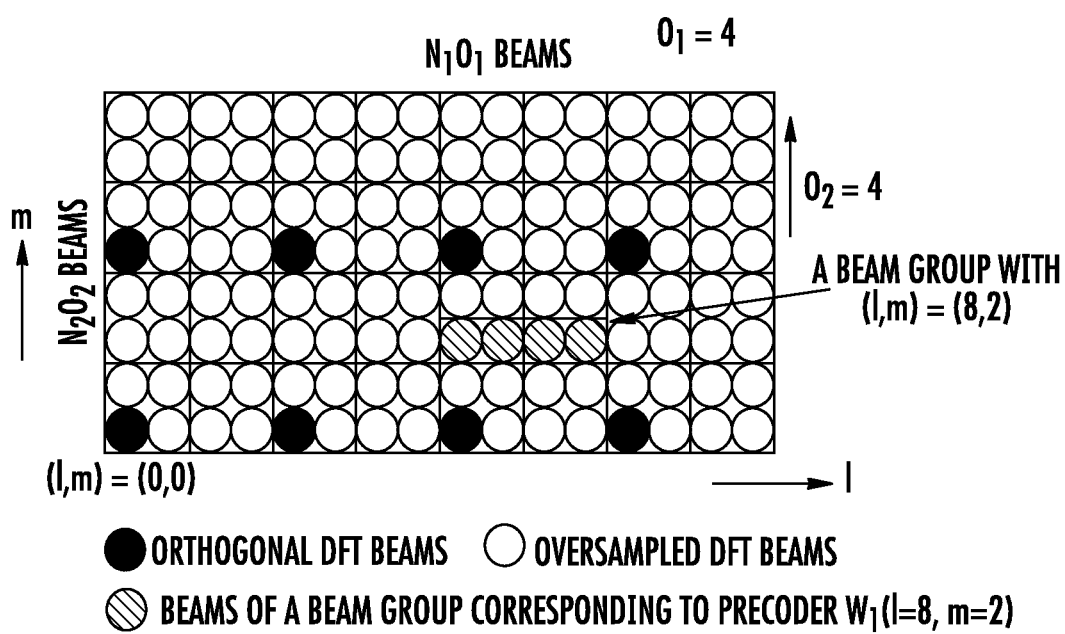
FIG. 22 is a grid of DFT beams.
Figure 24:
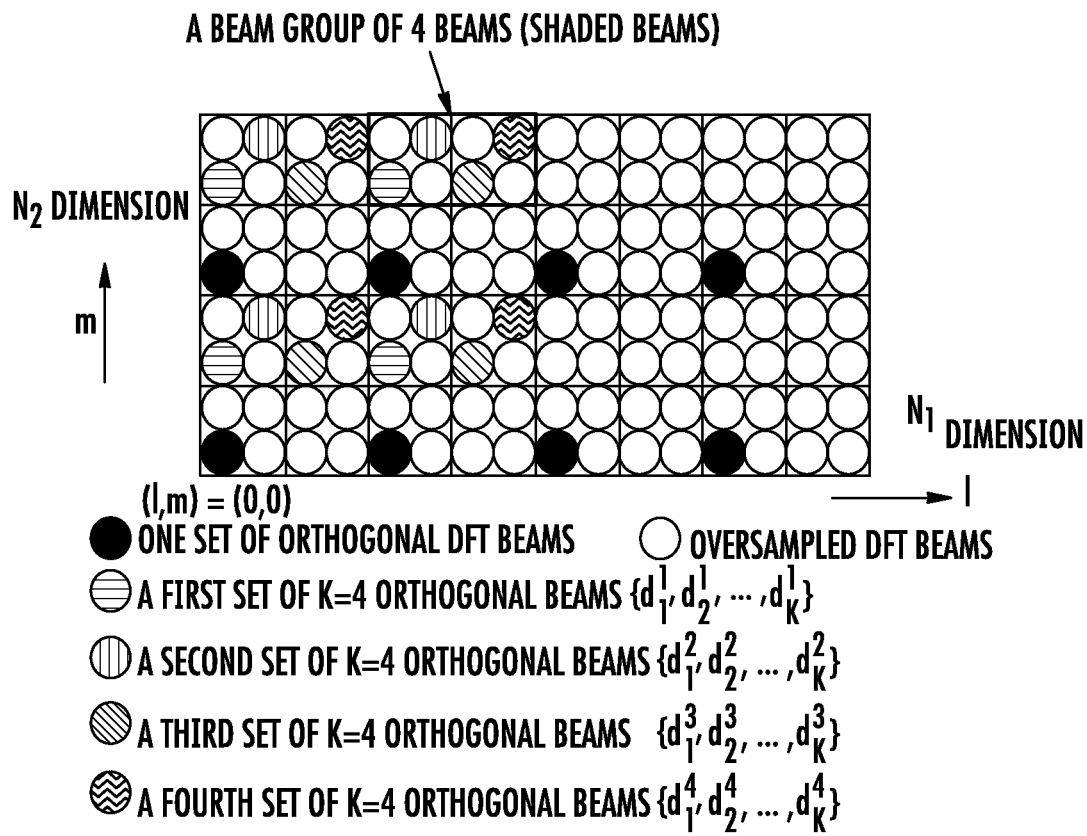
FIG. 24 is a grid of DFT beams.

In another scenario, referred to here as a "Type B multi-beam Codebook". $\{d_1, d_2, \ldots, d_K\}$ and $\{d'_1, d'_2, \ldots, d'_K\}$ may be different for different subbands. Multiple sets of $\{d_1, d_2, \ldots, d_K\}$ and $\{d'_1, d'_2, \ldots, d'_K\}$ are then used. Let $\{d_1^i, d_2^i, \ldots, d_K^i\}$, (i=1, 2, \ldots, $N_g$) be the $i^{th}$ set of beams, where $N_g$ is the number of beam sets, then $\{d_k^1, d_k^2, \ldots, d_k^{N_g}\}$ forms a beam group with adjacent oversampled DFT beams. An example is shown in FIG. 24, where four sets ($N_g = 4$) of $\{d_1, d_2, \ldots, d_K, K=4\}$ are depicted. In this example, for each k, the beam group resembles the beam group pattern of LTE Rel-13 with Codebook_config=3 shown in FIG. 21. Similarly, the other beam group patterns with Codebook_config=2 and 4 (FIG. 28 and FIG. 22) in LTE Rel-13 may be used. In this case, $W_1(k)$ and $W_2(k)$ can be rewritten as follows:

$$W_1(k) = \begin{bmatrix} d_k^1 & d_k^2 & d_k^3 & d_k^4 & 0 & 0 & 0 & 0 \\ 0 & 0 & 0 & 0 & d'^1_k & d'^2_k & d'^3_k & d'^4_k \end{bmatrix} \quad \text{Equation 28}$$

$$\begin{bmatrix} \sqrt{p_k} I_4 & 0 \\ 0 & \sqrt{p'_k} I_4 \end{bmatrix},$$

$k = 1, 2, \ldots, K.$

For rank = 1: $W_2(k) = \begin{bmatrix} e^{j\alpha^{(1)}_{2k-1}} e_s \\ e^{j\alpha^{(1)}_{2k}} e_s \end{bmatrix}$, $\quad$ Equation 29

$k = 1, 2, \ldots, K; s = 1, 2, 3, 4.$

-continued $$\text{For rank} = 2: W_2(k) = \begin{bmatrix} e^{j\alpha_{2k-1}^{(1)}} e_s & e^{j\alpha_{2k-1}^{(2)}} e_{s'} \\ e^{j\alpha_{2k}^{(1)}} e_s & e^{j\alpha_{2k}^{(2)}} e_{s'} \end{bmatrix},$$ Equation 30

$$k = 1, \ldots, K; s, s' = 1, 2, 3, 4.$$

Where $I_4$ is a 4×4 identity matrix and $e_s$ (s=1, 2, 3, 4) is a 4×1 vector with the $s^{th}$ entry equals to 1 and the rest of the entries equal to zero (e.g. $e_2 = [0\ 1\ 0\ 0]^T$)

Precoder W and the associated rank indicator (RI) as well as channel quality indicator (CQI) form a complete advanced channel state information (CSI) feedback report.

In some embodiments, a wireless device 16 estimates $\{W(k)\ (k=1, 2, \ldots, K)\}$ based on the configured CSI-RS, where K is preconfigured or signalled. $\{W(k)\ (k=1, 2, \ldots, K)\}$ is arranged such that $\|HW(1)\| \|HW(2)\| \geq \ldots \geq \|HW(K)\|$. In other words, the beam pair, $(d_1, d_1')$, provide the maximum signal power to the wireless device 16 while the beam pair, $(d_K, d_K')$, provides the least power to the wireless device 16 among the K beam pairs. The beam pair, $(d_1, d_1')$, is used as a reference for amplitude and phase, i.e. $p_1 = p_1' = 1$ and $e^{j\alpha_1^{(r)}} = 1$ (r=1, 2), and thus for a Type A Codebook, the corresponding $W_1(1)$ and $W_2(1)$ is then given by:

$$W_1(1) = \begin{bmatrix} d_1 & 0 \\ 0 & d_1' \end{bmatrix}$$ Equation 31

$$\text{For rank} = 1: W_2(1) = \begin{bmatrix} 1 \\ e^{j\alpha_2^{(1)}} \end{bmatrix},$$ Equation 32

$$\text{For rank} = 2: W_2(1) = \begin{bmatrix} 1 & 1 \\ e^{j\alpha_2^{(1)}} & e^{j\alpha_2^{(2)}} \end{bmatrix}$$ Equation 33

$$W_1(1) = \begin{bmatrix} d_1^1 & d_1^2 & d_1^3 & d_1^4 & 0 & 0 & 0 & 0 \\ 0 & 0 & 0 & 0 & d_1'^1 & d_1'^2 & d_1'^3 & d_1'^4 \end{bmatrix}$$ Equation 34

$$\text{For rank} = 1: W_2(1) = \begin{bmatrix} e_s \\ e^{j\alpha_2^{(1)}} e_s \end{bmatrix}, s = 1, 2, 3, 4.$$ Equation 35

$$\text{For rank} = 2: W_2(1) = \begin{bmatrix} e_s & e_{s'} \\ e^{j\alpha_2^{(1)}} e_s & e^{j\alpha_2^{(2)}} e_{s'} \end{bmatrix},$$ Equation 36

$$s, s' = 1, 2, 3, 4.$$

The wireless device 16 feeds back $\{W(k)\ (k=1, 2, \ldots, K)\}$ in multiple subframes, starting from W(1). Each feedback report is triggered by an aperiodic CSI request. In the first feedback, both RI and CQI may also be reported assuming sub-precoder W(1). This would allow data transmission with W(1) before receiving the rest of the sub-precoders. The feedback information for Type A Multi-beam codebook may include:

$$W_1(1) = \begin{bmatrix} d_1 & 0 \\ 0 & d_1' \end{bmatrix},$$

which includes the beam index (l, m) for $d_1$ (and $d_1'$ if $d_1' \neq d_1$), as shown in FIG. 23. Signaling the beam index (l, m) requires $\log_2(N_1N_2O_1O_2)$ bits, where $O_1$, $O_2$ are the oversampling factors in $N_1$ and $N_2$ dimension, respectively. For $N_1=4$, $N_2=2$, $O_1=O_2=4$, 7 bits are needed. If $d_1'$ is different from $d_1$, the beam index for $d_1'$ also needs to be fed back and additional 7 bits are required. For one dimensional antenna port layouts, the feedback requires $\log_2(N_1O_1)$ bits, where $N_1$ is the number of ports per polarization in the dimension that contains the antenna ports and $O_1$ is the corresponding oversampling factor.

$$W_2(1) = \begin{bmatrix} 1 \\ e^{j\alpha_2^{(1)}} \end{bmatrix} \text{ in case of rank} = 1 \text{ and}$$

$$W_2(1) = \begin{bmatrix} 1 & 1 \\ e^{j\alpha_2^{(1)}} & e^{j\alpha_2^{(2)}} \end{bmatrix}$$

in case of rank=2. If 2 bits are used for phase quantization, then 2 bits are needed for $\alpha_2^{(r)}$ per layer per subband. For 10 MHz LTE system bandwidth, there are 9 subbands, so 18 bits are needed for rank=1 and 36 bits for rank=2.

RI: 3 bits are needed for up to rank 8.

CQI: 4 bits for rank=1 and 7 bits for rank=2

A total of 32 bits are needed for rank=1 and 50 bits for rank=2 in case of $N_1=4$, $N_2=2$, $O_1=O_2=4$ and a 10 MHz LTE system bandwidth.

For Type B multi-beam codebook, the first feedback associated with W(1) includes:

$$W_1(1) = \begin{bmatrix} d_1^1 & d_1^2 & d_1^3 & d_1^4 & 0 & 0 & 0 & 0 \\ 0 & 0 & 0 & 0 & d_1'^1 & d_1'^2 & d_1'^3 & d_1'^4 \end{bmatrix},$$

only the beam index, (l, m), for $d_1^1$ (and $d_1'^1$ if $d_1^1 \neq d_1'^1$) needs to be signalled, $\log_2(N_1N_2O_1O_2 \cdot 2/N_9)$ bits are needed. If $d_1'$ is different from $d_1$, the beam index for $d_1'$ also needs to be fed back and additional $\log_2(N_1N_2O_1O_2 \cdot 2/N_9)$ bits are required.

$$W_2(1) = \begin{bmatrix} e_s \\ e^{j\alpha_2^{(1)}} e_s \end{bmatrix} \text{ in case of rank} = 1 \text{ and}$$

$$W_2(1) = \begin{bmatrix} e_s & e_{s'} \\ e^{j\alpha_2^{(1)}} e_s & e^{j\alpha_2^{(2)}} e_{s'} \end{bmatrix}$$

in case of rank=2. If 2 bits are used for phase quantization, then 2 bits are needed for $\alpha_2^{(r)}$ (r=1, 2) per subband. In addition, 2 bits are needed for s in case of rank=1 and additional bits for s' if s'≠s.

RI: 3 bits are needed for up to rank 8.

CQI: 4 bits for rank=1 and 7 bits for rank=2

In one embodiment, the first report is a Rel-13 (or its extension with more antenna ports in Rel-14 or later releases) codebook based CSI report. In this case, W(1) is the precoder in the Rel-13 codebooks corresponding to the feedback PMI values (or $i_{11}$ and $i_{12}$) for $W_1(1)$ and for $W_2(1)$. In this case, the first feedback is a legacy Rel-13 codebook based CSI feedback. For Type A multi-beam codebook, the first feedback report is a Rel-13 CSI report with Codebook_config=1. For Type B multi-beam codebook, the first feedback report is a Rel-13 CSI report with Codebook_config $\in$ (2, 3, 4).

In case of rank>2, one option is that there is no further feedback for advanced CSI, i.e. advanced CSI is only supported for rank=1 and rank=2. In other words, when the RI reported in the first report indicates a rank>2, then only W(1) is fed back.

Figure 25:
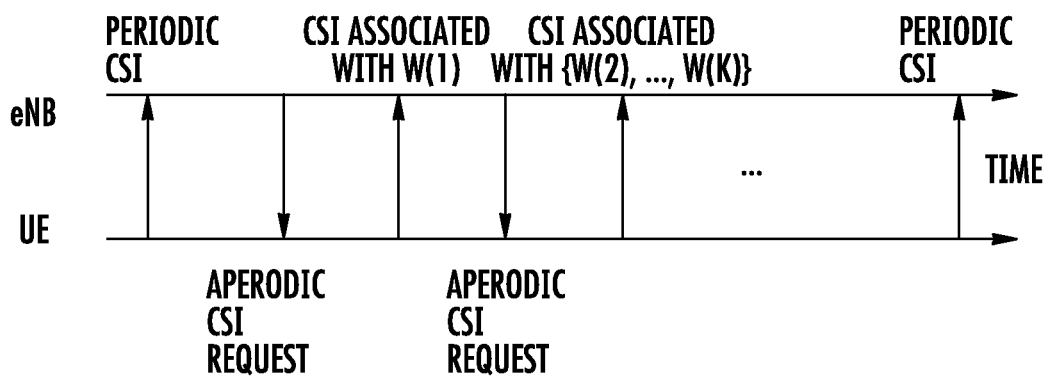
FIG. 25 is an illustration of transfer of CSI reports.

There can be a number of options in feeding back the rest of the K−1 remaining sub-precoders. In one scenario, the network node 14, e.g., eNB, may request the wireless device 16 to report all K−1 remaining sub-precoders {W(2), . . . , W(K)} in another subframe. As shown in the FIG. 25, the periodic CSI report is always based on the first sub-precoder W(1)=W$_1$(1)W$_2$(1), or the Rel-13 codebook based precoder. For aperiodic CSI reporting, the network node 14 sends a single Aperiodic CSI request to trigger the CSI associated with W(1), and another Aperiodic CSI request to trigger the CSIs associated with the remaining K−1 sub-precoders {W(2), . . . , W(K)}. In an LTE system, the Aperiodic CSI request is sent via the 'CSI request field' in the uplink scheduling grant. To differentiate between the CSI requests associated with W(1) and {W(2), . . . , W(K)}, the number of bits in the CSI request field may need to be extended beyond the currently allowed 1, 2, or 3 bits in LTE Rel-13 (note that 2 or 3 bits are used in the case of carrier aggregation). For instance, the CSI request field may be extended to 2, 3, or 4 bits (2 bits for non-carrier aggregation cases and 3 or 4 bits for carrier aggregation cases). Alternatively, a separate binary field may be introduced in the uplink scheduling grant to differentiate between the CSIs associated with W(1) and {W(2), . . . , W(K)}.

Figure 26:
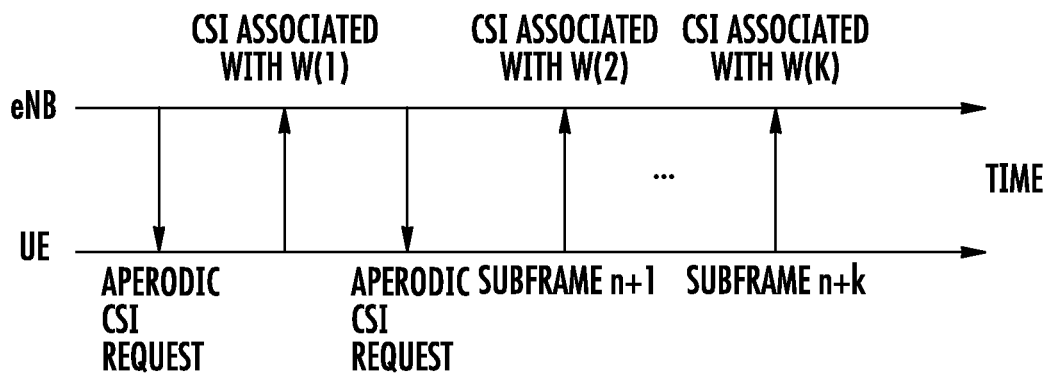
FIG. 26 is an illustration of transfer of CSI reports.
Figure 27:
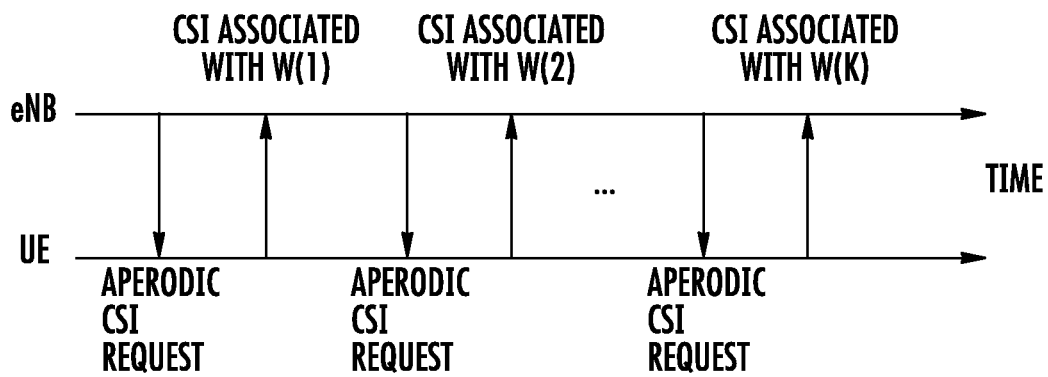
FIG. 27 is an illustration of transfer of CSI reports.

In another scenario, network node 14 may request the wireless device 16 to report the K−1 remaining sub-precoders (W(1), . . . , W(K)) in K−1 consecutive subframes with a single request, or "multi-shot" feedback. An example is shown in FIG. 26. As shown in the figure, the network node 14 sends one Aperiodic CSI request to trigger the CSI associated with W(1). Another Aperiodic CSI request is sent to trigger the CSIs associated with the remaining K−1 sub-precoders {W(2), . . . , W(K)}, which are reported in consecutive subframes. In an LTE system, the Aperiodic CSI request is sent via the 'CSI request field' in the uplink scheduling grant. To differentiate between the CSI requests associated with W(1) and {W(2), . . . , W(K)}, the number of bits in the CSI request field may need to be extended beyond the currently allowed 1 or 2 bits (note that 2 bits are used in the case of carrier aggregation). For instance, the CSI request field may be extended 2 or 3 bits (2 bits for non-carrier aggregation cases and 3 bits for carrier aggregation cases). Alternatively, a separate binary field may be introduced in the uplink scheduling grant to differentiate between the CSIs associated with W(1) and {W(2), . . . , W(K)}.

Figure 28:
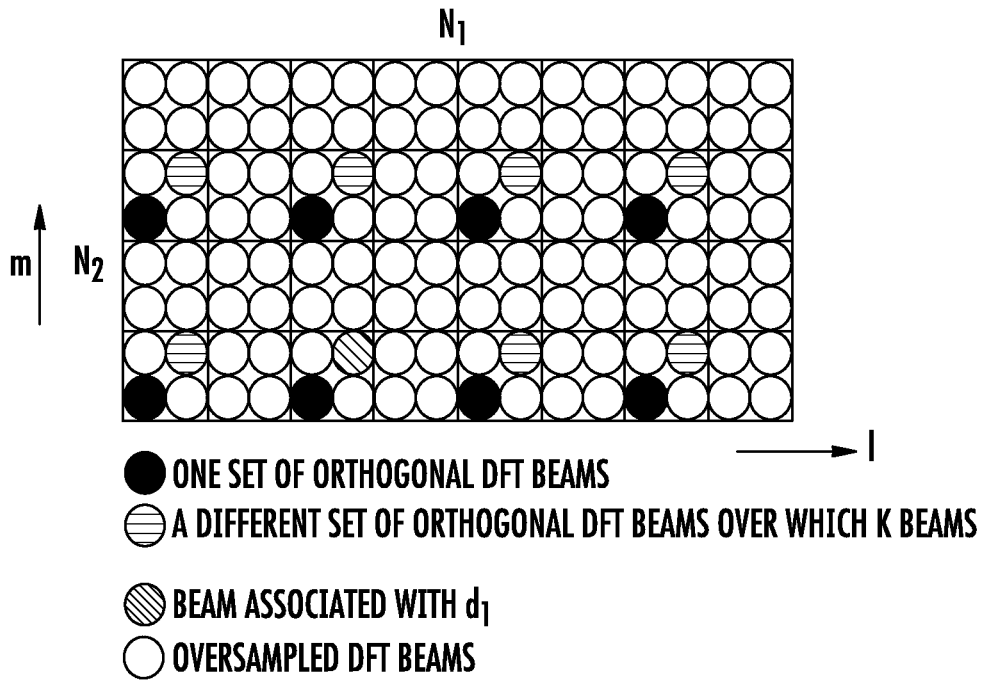
FIG. 28 is a grid of DFT beams.

In yet another scenario, the network node 14 may request the wireless device 16 to report the K−1 remaining sub-precoders {W(1), . . . , W(K)} in K−1 subframes with K−1 requests, or "one-shot" feedback (FIG. 28). Each request may also indicate which W(k) to be reported. This would provide more flexibility for the network node 14 to control the feedback in case a previous report was in error. In this case, a bit field may need to be added to the uplink scheduling grant in order to indicate which W(k) a particular aperiodic CSI request trigger refers to. Alternatively, the number of bits in the CSI request field in the current LTE uplink scheduling grant may need to be extended from the currently allowed 1, 2, or 3 bits to ceil[log$_2$(K−1)]+1 or ceil[log$_2$(K−1)]+2 bits, where ceil(x) indicates the smallest integer equal to or greater than x.

Figure 29:
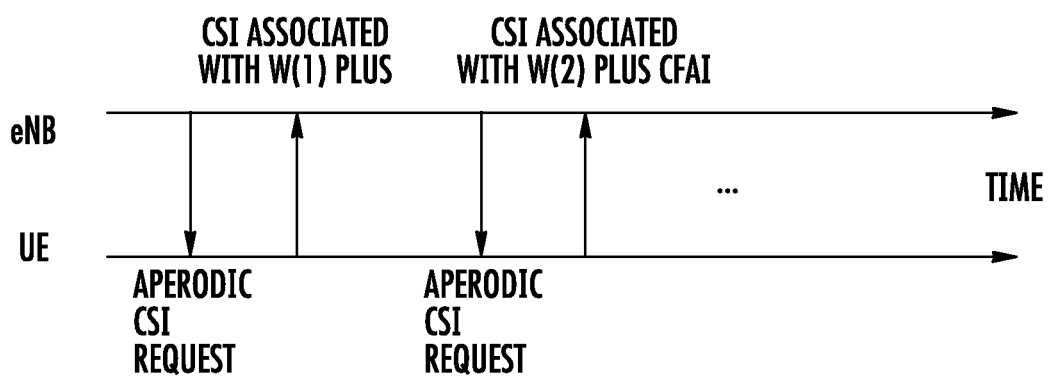
FIG. 29 is an illustration of transfer of CSI reports.

The feedback information for each subsequent W(k) for Type A multi-beam codebook may include:

$$W_1(k) = \begin{bmatrix} d_k & 0 \\ 0 & d'_k \end{bmatrix} \begin{bmatrix} \sqrt{p_k} & 0 \\ 0 & \sqrt{p'_k} \end{bmatrix},$$

which includes the beam index of each $d_k$ (k=2, . . . , K). Unlike in the case of $d_1$, only log$_2$(N$_1$N$_2$) bits are required for each $d_k$ (k>1). This is because the basis of the K orthogonal beams is known after $d_1$ is reported as shown in FIG. 29. Here, $d_1$ is within a group of 8 orthogonal beams, and so the remaining K−1 beams will be selected from among the group. At most 3 bits are needed to select each beam within this 8 beam group. In general, since there are N$_1$N$_2$ orthogonal beams, then at most log$_2$ N$_1$N$_2$ bits are needed to select each of the K−1 beams from the groups of orthogonal beams. If $d_k'$ is different from $d_k$, then the beam index for $d_k'$ also needs to be fed back and 3 additional bits are required for a group of 8 orthogonal beams. For $$\sqrt{p_k}, \sqrt{p'_k} \in \left\{ \frac{i}{Q_p}, i = 0, 1, \ldots, Q_p - 1 \right\},$$

each need log$_2$(Q$_p$) bits.

$$W_2(k) = \begin{bmatrix} e^{j\alpha_{2k-1}^{(1)}} \\ e^{j\alpha_{2k}^{(1)}} \end{bmatrix}$$

in case of rank=1 and $$W_2(k) = \begin{bmatrix} e^{j\alpha_{2k-1}^{(1)}} & e^{j\alpha_{2k-1}^{(2)}} \\ e^{j\alpha_{2k}^{(1)}} & e^{j\alpha_{2k}^{(2)}} \end{bmatrix}$$

in case of rank=2, W$_2$(k) is reported per subband. If 2 bits for phase quantization, 4 bits are needed for rank=1 and 8 bits for rank=2 per subband. For 10 MHz system bandwidth, there are 9 subbands, so 36 bits are needed for rank=1 and 72 bits for rank=2.

Optionally, CQI may be reported with 4 bits for rank=1 and 7 bits for rank=2 by assuming the previously reported rank and a precoder $\hat{W}$:

$$\hat{W} = W_1 W_2 = \sum_{i=1}^{k} W_1(d_i) W_2(d_i)$$

Alternatively, a wireless device 16 may determine which W(k) to feedback and include the corresponding beam index in a feedback report. So when the network node 14 receives the feedback report, it knows which beam the feedback is corresponding to. In this case, the feedback payload size is the same for each W(k) (k=2, . . . , K) so the same uplink resource allocation could be used for each feedback.

In each feedback report, CQI may also be reported by assuming a precoder constructed with all the previously reported sub-precoders. For example, if W(2) is reported in a subframe, the CQI reported in the same subframe would assume a precoder $\hat{W}$ where $$\hat{W} = W(1) + W(2)$$

In one scenario, the CQI reported in each feedback may be used by the network node 14 to determine if feedback of additional beams is needed. For example, let $CQI_k$ be the CQI associated with kth feedback and if $CQI_k$–$CQI_{k-1}$ is smaller than a threshold, the network node 14 may decide that additional feedback is not needed. In some embodiments, $CQI_k$ may be a measurement of channel quality in units of spectral efficiency (bits/second/Hz), or it may be a positive integer that monotonically increases with channel quality.

In another scenario, instead of feeding back $CQI_k$, $\Delta CQI_k = CQI_k - CQI_{k-1}$ may be actually fed back at the kth feedback with k>1. Alternatively, in each feedback, the wireless device 16 may also feedback a CSI feedback accuracy indicator (CFAI) to indicate the percentage of power with reported sub-precoder or sub-precoders. An example is shown in FIG. 29. In one embodiment, the CFAI indicator may indicate the following power ratio in the $L^{th}$ feedback report:

$$\gamma = \frac{\left\|\sum_{k=1}^{L} HW(k)\right\|^2}{\left\|\sum_{k=1}^{K} HW(k)\right\|^2}$$

In another embodiment, the CFAI may indicate the percentage of power with reported sub-precoder as follows $$\gamma(k) = \frac{\|HW(L)\|^2}{\left\|\sum_{k=1}^{K} HW(k)\right\|^2}$$

The CFAI may be used to help the network node 14 to determine if additional feedback is required. For example, if $\gamma$ or $\gamma(1)$ reported with W(1) exceeds certain threshold, e.g. 95%, the network node 14 may decide the feedback is good enough and thus stop any further feedback request for the remaining sub-precoders.

In some cases, the network node 14 may need advanced CSI on part of the system bandwidth. In this case, instead of measuring and feeding back CSI for all subbands, CSI over only a subset of the subbands may be measured and reported. The subbands to be reported may be indicated in the CSI trigger. This would help to reduce feedback overhead.

In some embodiments, an indication is provided in the CSI trigger to indicate whether legacy CSI report (i.e. CSI reports based on codebook in LTE Rel-13 or prior releases) or advanced CSI report is requested.

Figure 30:
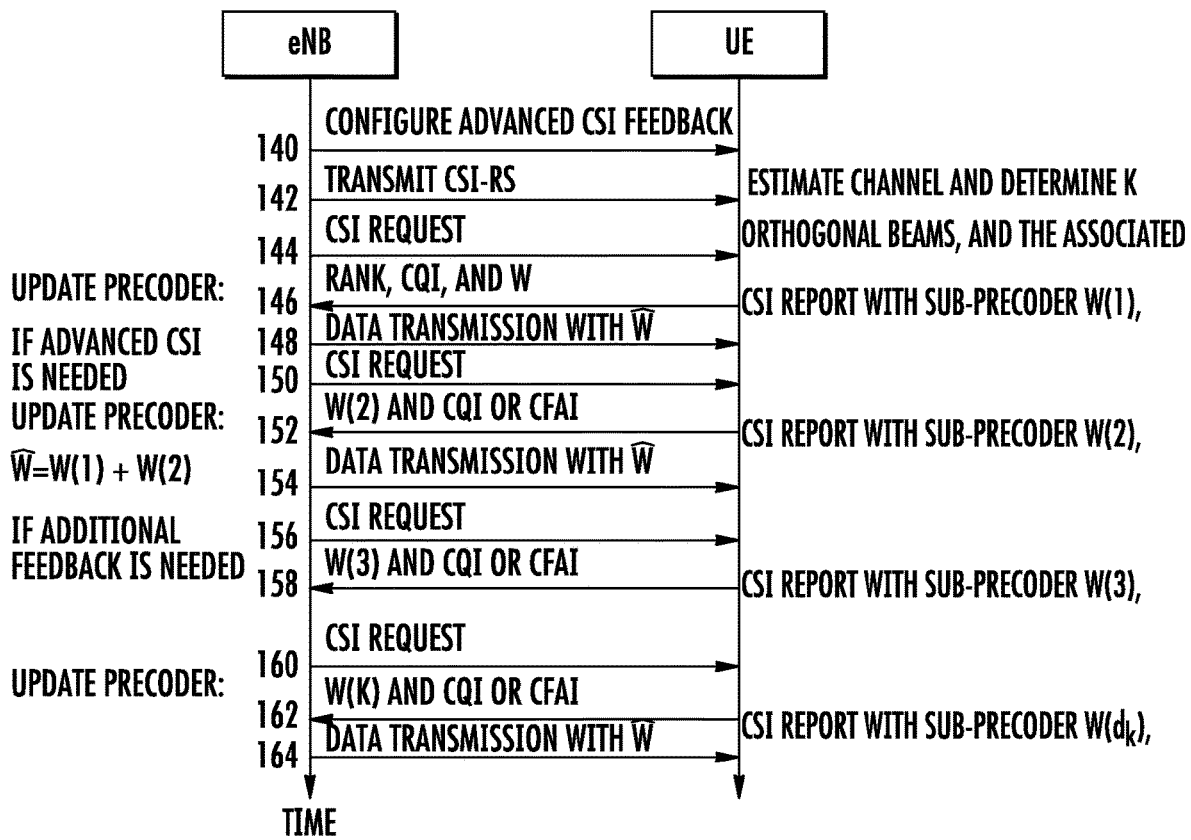
FIG. 30 is an illustration of signaling and reporting between a base station and a wireless device.

The overall signaling and reporting between a network node 14 and a wireless device 16 according to one embodiment is shown in FIG. 30. In a first step 140, the network node 14 sends signaling to the WD 16 to configure the WD 16 for advanced CSI feedback. In a next step 142, the network node 14 transmits a CSI-RS to the wireless device 16. At step 144, the network node 14 sends a CSI request to the wireless device 16. In response, at step 146, the wireless device 16 transmits a CSI report containing a Rank indicator, CQI and precoder W(1). At step 148, the network node 14 transmits with a precoder that is equal to or based on W(1). At step 150, the network node 14 transmits another CSI request. In response, at step 152, the wireless device 16 sends a second precoder W(2), a CQI or CFAI. At step 154, the network node 14 transmits data using a precoder based on W(1) and W(2). At step 156, if additional feedback is desired, the network node 14 sends another CSI request. At step 169, a third precoder W(3) and a CQI or CFAI is received at the network node 14 from the wireless device 16. The process continues and repeats with steps 160, 162 and 164.

Thus, some embodiments include a method of determining multi-beam channel state information, CSI. The method includes generating a first CSI report 50 associated with a first beam S128; and generating a second CSI report 50 associated with a second beam, the second CSI report including at least a co-phasing coefficient between the first and second beams S130.

In some embodiments, the method further includes selecting the first and second beams according to a subband. In some embodiments, the first beam provides greater signal power to a wireless device 16 than the second beam. In some embodiments, each of the first and second CSI reports 50 includes at least a precoder indicator. In some embodiments, the first CSI report 50 includes a first precoder, the second CSI report 50 includes a second precoder and a linear combination of the first and second precoders has a channel estimation accuracy exceeding a channel estimation accuracy of any one of the first and second sub-precoders. In some embodiments, each of the first and second beams has associated an ordered set of complex numbers, each complex number mapped to an antenna port E of an antenna array. In some embodiments, a phase difference between any two complex numbers associated with two adjacent antenna ports E is a constant. In some embodiments, the co-phasing coefficient is a complex number. In some embodiments, each beam of the first beam (128) and second beams is a kth beam, d(k), that has associated a set of complex numbers and has index pair ($l_k$, $m_k$), each element of the set of complex numbers being characterized by at least one complex phase shift such that:

$d_n(k) = d_i(k)\alpha_{i,n} e^{j2\pi(p\Delta_{1,k} + q\Delta_{1,k})}$;

$d_n(k)$, and $d_i(k)$ are the $i^{th}$ and $n^{th}$ elements of d(k), respectively;

$\alpha_{i,n}$ is a real number corresponding to the $i^{th}$ and $n^{th}$ elements of d(k);

p and q are integers;

beam directions $\Delta_{1,k}$ and $\Delta_{2,k}$ are real numbers corresponding to beams with index pair ($l_k$, $m_k$) that determine the complex phase shifts $e^{j2\pi\Delta_{1,k}}$ and $e^{j2\pi\Delta_{2,k}}$ respectively; and each of the at least a co-phasing coefficient between the first and second beam (S130) is a complex number $c_k$ for d(k) that is used to adjust the phase of the $i^{th}$ element of d(k) according to $c_k d_i(k)$.

In some embodiments, a method in a wireless device 16 of reporting a precoder, W, for a plurality of antenna ports at a network node 14 is provided. In some embodiments, the precoder W is a linear combination of at least a first and a second sub-precoder. The method includes receiving from the network node 14 in a first time instance, a first CSI feedback request requesting CSI feedback S132. The method also includes reporting a first CSI report identifying the first sub-precoder S134. The method also includes receiving from the network node 14 in a second time instance, a second CSI feedback request requesting additional CSI feedback S136, and reporting a second CSI report identifying the second sub-precoder S138.

In some embodiments, the at least first and second sub-precoders are determined by the wireless device 16 based on received channel state information reference signals, CSI-RS, in a subframe from the network node 14. In some embodiments, the CSI-RS are received in a same subframe as the first CSI feedback request. In some embodiments, the first sub-precoder comprises a first orthogonal Discrete Fourier Transform, DFT, beam and the second sub-precoder comprises a second DFT beam. In some embodiments, the first and second sub-precoders are each associated with a first and a second power level, respectively, and the first power level is greater than the second power level. In some embodiments, the first CSI request further includes sending an indicator to indicate whether the CSI request is for a CSI report 50 based on one of a legacy codebook and a high resolution codebook. In some embodiments, the first and second sub-precoders are identified by a first and a second beam index, respectively. In some embodiments, the first and second CSI reports 50 each identify first and second power levels, respectively. In some embodiments, the first and the second power levels are normalized with respect to the first power level so that the first power level is not explicitly reported in the first CSI report 50. In some embodiments, the second sub-precoder comprises at least one phasing coefficient for linearly combining the first and the second precoders. In some embodiments, the method further includes reporting a CSI feedback accuracy indicator, CFAI. In some embodiments, the CFAI is reported in the second CSI report 50 and is conditioned on a reconstructed precoder with both the first and the second sub-precoder, wherein the first and second sub-precoders are represented as W(1) and W(2) respectively, and the reconstructed precoder is represented as W=W(1)+W(2). In some embodiments, the precoder W comprises more than two sub-precoders, the second CSI report 50 includes a third sub-precoder. In some embodiments, the precoder W comprises more than two sub-precoders, and a third CSI report 50 identifying a third sub-precoder is transmitted in a third time instance. In some embodiments, the receiving further comprising receiving a third CSI feedback request if the precoder W comprises more than two sub-precoders and indicating to the network node 14 based on the CFAI that additional feedback is desired. In some embodiments, the first CSI report 50 also includes a rank indicator, RI, a channel quality indicator, CQI, conditioned on the first sub-precoder. In some embodiments, the second CSI report 50 includes a channel quality indicator, CQI, conditioned on the reconstructed precoder from the first and the second sub-precoders. In some embodiments, the requested CSI and the precoder, W, can be one of either wideband and subband. In some embodiments, the first CSI report 50 is determined using a codebook of single DFT beam precoders. In some embodiments, sending a CSI request further includes sending an indicator to indicate whether the request is for a CSI report 50 based on one of a codebook of single DFT beam precoders and a codebook of multi-beam precoders.

In some embodiments, a wireless device 16 is configured to determine multi-beam channel state information, CSI. The wireless device 16 includes processing circuitry 42 configured to generate a first and a second CSI reports 50, the first CSI report 50 associated with a first beam, the second CSI report 50 associated with a second beam, the second CSI report 50 including at least a co-phasing coefficient between the first and second beams. Further, a transceiver 48_is configured to transmit the first and second CSI reports 50 to a network node 14.

In some embodiments, the processing circuitry 42 is further configured to select the first and second beams according to a subband. In some embodiments, the first beam provides greater signal power to the wireless device 16 than the second beam. In some embodiments, each of the first and second CSI reports 50 includes at least a sub-precoder indicator. In some embodiments, the first CSI report 50 includes a first sub-precoder, the second CSI report 50 includes a second sub-precoder and a linear combination of the first and second sub-precoders has a channel estimation accuracy exceeding a channel estimation accuracy of any one of the first and second sub-precoders. In some embodiments, each of the first and second beams has associated an ordered set of complex numbers, each complex number mapped to an antenna port E of an antenna array. In some embodiments, a phase difference between any two complex numbers associated with two adjacent antenna ports is a constant. In some embodiments, the co-phasing coefficient is a complex number.

In some embodiments, a wireless device 16 is configured to report a precoder W, for a plurality of antenna ports E at a network node 14, wherein the precoder W is a linear combination of at least a first and a second sub-precoder. The wireless device 16 includes processing circuitry 42 configured to: receive from the network node 14 in a first time instance, a first CSI feedback request requesting CSI feedback: report a first CSI report 50 identifying the first sub-precoder; receive from the network node 14 in a second time instance, a second CSI feedback request requesting additional CSI feedback, and report a second CSI report 50 identifying the second sub-precoder.

In some embodiments, the at least first and second sub-precoders are determined by the wireless device 16 based on received channel state information reference signals, CSI-RS, in a subframe from the network node 14. In some embodiments, the CSI-RS are received in a same subframe as the first CSI feedback request. In some embodiments, the first sub-precoder comprises a first orthogonal Discrete Fourier Transform, DFT, beam and the second sub-precoder comprises a second DFT beam. In some embodiments, the first and second sub-precoders are each associated with a first and a second power level, respectively, and the first power level is greater than the second power level. In some embodiments, the first CSI request further includes sending an indicator to indicate whether the CSI request is for a CSI report based on one of a legacy codebook and a high resolution CSI report. In some embodiments, the first and second sub-precoders are identified by a first and a second beam index, respectively. In some embodiments, the first and second CSI reports each identify first and second power levels, respectively. In some embodiments, the first and the second power levels are normalized with respect to the first power level so that the first power level is not explicitly reported in the first CSI report. In some embodiments, the second sub-precoder comprises at least one phasing coefficient for linearly combining the first and the second precoders. In some embodiments, the method further includes reporting a CSI feedback accuracy indicator, CFAI. In some embodiments, the CFAI is reported in the second CSI report and is conditioned on a reconstructed precoder with both the first and the second sub-precoder, wherein the first and second sub-precoders are represented as W(1) and W(2) respectively, and the reconstructed precoder is represented as W=W(1)+W(2). In some embodiments, the precoder W comprises more than two sub-precoders, the second CSI report includes a third sub-precoder. In some embodiments, the precoder W comprises more than two sub-precoders, and a third CSI report identifying a third sub-precoder is transmitted in a third time instance. In some embodiments, the receiving further comprising receiving a third CSI feedback request if the precoder W comprises more than two sub-precoders and indicating to the network node 14 based on the CFAI that additional feedback is desired. In some embodiments, the first CSI report 50 also includes a rank indicator, RI, a channel quality indicator, CQI, conditioned on the first sub-precoder. In some embodiments, the second CSI report 50 includes a channel quality indicator, CQI, conditioned on the reconstructed precoder from the first and the second sub-precoders. In some embodiments, the requested CSI and the precoder, W, can be one of either wideband and subband. In some embodiments, the first CSI report 50 is determined using a codebook of single DFT beam precoders. In some embodiments, sending a CSI request further includes sending an indicator to indicate whether the request is for a CSI report 50 based on one of a codebook of single DFT beam precoders and a codebook of multi-beam precoders.

In some embodiments, a wireless device 16 is configured to determine multi-beam channel state information, CSI. The wireless device 16 includes a memory module 45 configured to store first and second CSI reports 50, the first CSI report 50 associated with a first beam, the second CSI report 50 associated with a second beam, the second CSI report including at least a co-phasing coefficient between the first and second beams. The wireless device 16 further includes a CSI report generator module 21 configured to generate the first and second CSI reports 50; and a transceiver module 49 configured to transmit the first and second CSI reports to a network node 14.

In some embodiments, a method in a network node 14 for obtaining a precoder based on information from a wireless device 16 is provided. The method includes transmitting to the wireless device 16 a channel state information-reference symbol, CSI-RS, for estimating W S122. The method includes receiving from the wireless device 16, multiple precoders W(1), . . . W(k), S124; and computing a precoder W=W(1)+ . . . +W(k) S126.

In some embodiments, the method further includes transmitting antenna dimension parameters $N_1$ and $N_2$ and associated DFT beam oversampling factors $O_1$ and $O_2$. In some embodiments, the method further includes transmitting a first CSI feedback request requesting CSI feedback. In some embodiments, the method further includes receiving from the wireless device 16 CSI including a rank indicator, RI, and a channel quality indicator, CQI, conditioned on a first sub-precoder, W(1) and RI. In some embodiments, the method further includes transmitting a second CSI feedback request requesting additional CSI feedback. In some embodiments, the method includes receiving from the wireless device (16) a second CSI report comprising a second sub-precoder, W(2), a rank indicator, RI, and a channel quality indicator, CQI, conditioned on a reconstructed precoder with both the first and the second sub-precoders, W(1)+W(2). In some embodiments, the method further includes receiving from the wireless device 16 CSI including a first CSI feedback accuracy indicator, CFAI. In some embodiments, the method further includes determining if additional CSI feedback is desired, and if so, then sending to the wireless device 16 an additional CSI feedback request; and receiving from the wireless device 16 CSI including a next sub-precoder and a next CFAI.

In some embodiments, a network node 14 for obtaining a precoder based on information from a wireless device 16 is provided. The network node 14 includes a transceiver 28 configured to: transmit to the wireless device 16 a channel state information-reference symbol, CSI-RS, for estimating W. The transceiver 28 is also configured to receive from the wireless device 16, multiple sub-precoders W(1), . . . W(k). The network node 14 also includes a processor 26 configured to compute a precoder W=W(1)+ . . . +W(k) via precoder computer 18.

In some embodiments, the transceiver 28 is further configured to transmit antenna dimension parameters N and $N_2$ and associated DFT beam oversampling factors $O_1$ and $O_2$. In some embodiments, the transceiver 28 is further configured to transmit a first CSI feedback request requesting CSI feedback. In some embodiments, the transceiver 28 is further configured to receive from the wireless device 16 CSI including a rank indicator, RI, and a channel quality indicator, CQI, conditioned on a first sub-precoder, W(1) and RI. In some embodiments, the transceiver 28 is further configured to transmit a second CSI feedback request requesting additional CSI feedback. In some embodiments, the transceiver (28) is further configured to receive from the wireless device (16) a second CSI report comprising a second sub-precoder, W(2), a rank indicator, RI, and a channel quality indicator, CQI, conditioned on a reconstructed precoder with both the first and the second sub-precoders, W(1)+W(2).

In some embodiments, the transceiver is further configured to receive from the wireless device 16 CSI including a first CSI feedback accuracy indicator, CFAI. In some embodiments, the network node 14 includes a processor configured to determine if additional CSI feedback is desired, and if so, then: sending to the wireless device 16 an additional CSI feedback request; and receiving from the wireless device 16 CSI including a next sub-precoder and a next CFAI.

In some embodiments, a network node 14 is configured to obtain a precoder based on information received from a wireless device 16. The network node 14 includes a memory module 25 configured to store: a channel state information-reference symbol, CSI-RS, 32 for estimating W; and multiple sub-precoders, W(1), . . . W(k), 34. The network node 14 also includes a precoder computer module 19 configured to compute a precoder W=W(1)+ . . . +W(k); and a transceiver module 29 configured to transmit the CSI-RS to the wireless device 16 and to receive from the wireless device 16 the multiple sub-precoders W(1), . . . W(k).

Some embodiments include:

Embodiment 1

A method of determining multi-beam channel state information, CSI, the method comprising:

generating a first CSI report associated with a first beam; and generating a second CSI report associated with a second beam, the second CSI report including at least a co-phasing coefficient between the first and second beams.

Embodiment 2

The method of Embodiment 1, further comprising selecting the first and second beams according to a subband.

Embodiment 3

The method of Embodiment 1, wherein the first beam provides greater signal power to a wireless device than the second beam.

Embodiment 4

The method of Embodiment 1, wherein each of the first and second CSI reports includes at least a precoder indicator.

Embodiment 5

The method of Embodiment 1, wherein the first CSI report includes a first precoder, the second CSI report includes a second precoder and a linear combination of the first and second precoders has a channel estimation accuracy exceeding a channel estimation accuracy of any one of the first and second precoders.

Embodiment 6

The method of Embodiment 1, wherein each of the first and second beams has associated an ordered set of complex numbers, each complex number mapped to an antenna port of an antenna array.

Embodiment 7

The method of Embodiment 7, wherein a phase difference between any two complex numbers associated with two adjacent antenna ports is a constant.

Embodiment 8

The method of Embodiment 1, wherein the co-phasing coefficient is a complex number.

Embodiment 9

A method of obtaining a precoder based on information from a wireless device, the method comprising:
    signaling to the wireless device by a network node a number of orthogonal discrete Fourier transform, DFT, beams, K, the number of orthogonal DFT beams being used to represent an antenna precoder W at a frequency;
    transmitting to the wireless device a CSI reference signal, CSI-RS, in a subframe for estimating $W=W(1)+W(2)+ \ldots +W(K)$, and $W(k)$ is a precoder associated with a kth selected beam;
    sending by the network node to the wireless device, a first CSI feedback request requesting CSI feedback;
    receiving from the wireless device CSI including a first precoder $W(1)$, a rank indicator, RI, and a channel quality indicator, CQI, conditioned on $W(1)$ and RI;
    sending by the network node to the wireless device, a second CSI feedback request requesting additional CSI feedback;
    receiving from the wireless device, CSI including a second precoder $W(2)$ and a CSI feedback accuracy indicator, CFAI;
    determining at the network node whether additional CSI feedback is desired based on the CFAI;
    if additional CSI feedback is desired:
    sending to the wireless device an additional CSI feedback request; and
    receiving from the wireless device CSI including a next precoder, $W(k)$, $2<k<K$ and a second CFAI; and
    constructing at the network node a precoder $W=W(1)+W(2)+ \ldots W(k)$ which provides better performance than any of the precoders, $W(1), W(2) \ldots W(k)$, individually.

Embodiment 10

The method of Embodiment 9, wherein the signaling from the network node to the wireless device includes antenna dimension parameters $N_1$ and $N_2$ and associated DFT beam oversampling factors $O_1$ and $O_2$.

Embodiment 11

The method of Embodiment 9, wherein reporting in response to the first CSI feedback request is a CSI report based on a legacy long term evolution, LTE, codebook.

Embodiment 12

The method of Embodiment 9, wherein sending a CSI request further includes sending an indicator to indicate whether the request is for a CSI report based on one of a legacy codebook and a high resolution CSI report.

Embodiment 13

The method of Embodiment 9, wherein the reporting of $W(k)$, $1<k\leq K$ also includes reporting the beam index, k.

Embodiment 14

The method of Embodiment 9, wherein the CFAI reported with $W(k)$ is conditioned on a precoder $W=W(1)+W(2)+ \ldots +W(k)$.

Embodiment 15

The method of Embodiment 9, wherein the CFAI reported with $W(k)$ is conditioned on a precoder $W=W(k)$.

Embodiment 16

A network node configured to obtain a precoder based on information from a wireless device, the network node comprising:
    processing circuitry including a memory and a processor;
    the memory configured to store a number of beams, K, and at least one precoder W;
    the processor configured to:
        signal to the wireless device by a network node a number of orthogonal discrete Fourier transform, DFT, beams, K, the number of orthogonal DFT beams being used to represent an antenna precoder W at a frequency;
        transmit to the wireless device a CSI reference signal, CSI-RS, in a subframe for estimating $W=W(1)+W(2)+.*+W(K)$, and $W(k)$ is a precoder associated with a kth selected beam;
        send by the network node to the wireless device, a first CSI feedback request requesting CSI feedback;
        receive from the wireless device CSI including a first precoder $W(1)$, a rank indicator, RI, and a channel quality indicator, CQI, conditioned on $W(1)$ and RI;
        send by the network node to the wireless device, a second CSI feedback request requesting additional CSI feedback;
        receive from the wireless device, CSI including a second precoder $W(2)$ and a CSI feedback accuracy indicator, CFAI;
        determine at the network node whether additional CSI feedback is desired based on the CFAI;
        if additional CSI feedback is desired:
            send to the wireless device an additional CSI feedback request; and receive from the wireless device CSI including a next precoder, W(k), 2<k<K and a second CFAI; and construct at the network node a precoder W=W(1)+W(2)+ ... W(k) which provides better performance than any of the precoders, W(1), W(2) ... W(k), individually.

Embodiment 17

The network node of Embodiment 16, further comprising signaling from the network node to the wireless device antenna dimension parameters $N_1$ and $N_2$ and associated DFT beam oversampling factors $O_1$ and $O_2$.

Embodiment 18

The network node of Embodiment 16, further comprising receiving from the wireless device a CSI report based on a legacy long term evolution, LTE, codebook.

Embodiment 19

The network node of Embodiment 16, further including sending to the wireless device an indicator to indicate whether the request is for a CSI report based on one of a legacy codebook and a high resolution CSI report.

Embodiment 20

The network node of Embodiment 16, wherein the receiving of W(k), 1<k≤K includes receiving the beam index, k.

Embodiment 21

The network node of Embodiment 16, wherein a CSI feedback accuracy indicator, CFAI, is received with W(k) and is conditioned on a precoder W=W(1)+W(2)+ ... +W(k).

Embodiment 22

The network node of Embodiment 21, wherein the CFAI reported with W(k) is conditioned on a precoder W=W(k).

Embodiment 23

A network node, configured to obtain a precoder based on information from a wireless device, the network node comprising:

a memory module configured to store a number of beams, K, and at least one precoder W;

a signaling module configured to signal to the wireless device a number of orthogonal discrete Fourier transform, DFT, beams, K, the number of orthogonal DFT beams being used to represent an antenna precoder W at a frequency;

a transmit module configured to transmit to the wireless device a CSI reference signal, CSI-RS, in a subframe for estimating W=W(1)+W(2)+ ... +W(K), and W(k) is a precoder associated with a kth selected beam;

a sending module configured to send by the network node to the wireless device, a first CSI feedback request requesting CSI feedback;

a receiving module configured to receive from the wireless device CSI including a first precoder W(1), a rank indicator, RI, and a channel quality indicator, CQI, conditioned on W(1) and RI;

the sending module configured to send by the network node to the wireless device, a second CSI feedback request requesting additional CSI feedback;

the receive module configured to receive from the wireless device, CSI including a second precoder W(2) and a CSI feedback accuracy indicator, CFAI;

a determining module configured to determine at the network node whether additional CSI feedback is desired based on the CFAI;

if additional CSI feedback is desired:
the sending module configured to send to the wireless device an additional CSI feedback request; and
the receive module configured to receive from the wireless device CSI including a next precoder, W(k), 2<k<K and a second CFAI; and a constructing module configured to construct at the network node a precoder W=W(1)+W(2)+ ... W(k) which provides better performance than any of the precoders, W(1), W(2) ... W(k), individually.

Embodiment 24

A method for obtaining a precoder based on information from a wireless device, the method comprising:

transmitting to the wireless device a number of beams K used to represent a decoder W;

transmitting to the wireless device a channel state information-reference symbol.

CSI-RS, for estimating W;

receiving from the wireless device multiple precoders W(1), ... W(k), 1<k<K; and computing a precoder W=W(1)+ ... +W(k).

Embodiment 25

A network node configured to obtain a precoder based on information from a wireless device, the network node comprising:

processing circuitry including a memory and a processor:
the memory configured to store:
a number of beams, K, used to represent a precoder W;
a channel state information-reference symbol, CSI-RS, for estimating W; and
multiple precoders, W(1), ... W(k), 1<k<K; and
the processor in communication with the memory and configured to:
compute a precoder W=W(1)+ ... +W(k); and
a transceiver in communication with the processor and the memory and configured to transmit K and the CSI-RS to the wireless device and to receive from the wireless device the multiple precoders W(1), ... W(k), 1<k<K.

Embodiment 26

A network node configured to obtain a precoder based on information received from a wireless device, the network node including:

a memory module configured to store:
a number of beams, K, used to represent a precoder W;
a channel state information-reference symbol, CSI-RS, for estimating W; and
multiple precoders, W(1), ... W(k), 1<k<K; and
a precoder module configured to compute a precoder W=W(1)+ ... +W(k); and a transceiver module configured to transmit K and the CSI-RS to the wireless device and to receive from the wireless device the multiple precoders W(1), ... W(k), 1<k<K.

Embodiment 27

A wireless device configured to determine multi-beam channel state information, CSI, the wireless device comprising:
processing circuitry including a memory and a processor;
the memory configured to store first and second CSI reports, the first CSI report associated with a first beam, the second CSI report associated with a second beam, the second CSI report including at least a co-phasing coefficient between the first and second beams; and
the processor configured to generate the first and second CSI reports; and
a transceiver configured to transmit the first and second CSI reports to a network node.

Embodiment 28

The wireless device of Embodiment 27, wherein the processor is further configured to select the first and second beams according to a subband.

Embodiment 29

The wireless device of Embodiment 27, wherein the first beam provides greater signal power to a wireless device than the second beam.

Embodiment 30

The wireless device of Embodiment 27, wherein each of the first and second CSI reports includes at least a precoder indicator.

Embodiment 31

The wireless device of Embodiment 27, wherein the first CSI report includes a first precoder, the second CSI report includes a second precoder and a linear combination of the first and second precoders has a channel estimation accuracy exceeding a channel estimation accuracy of any one of the first and second precoders.

Embodiment 32

The wireless device of Embodiment 27, wherein each of the first and second beams has associated an ordered set of complex numbers, each complex number mapped to an antenna port of an antenna array.

Embodiment 33

The wireless device of Embodiment 32, wherein a phase difference between any two complex numbers associated with two adjacent antenna ports is a constant.

Embodiment 34

The wireless device of Embodiment 27, wherein the co-phasing coefficient is a complex number.

Embodiment 35

A wireless device configured to determine multi-beam channel state information, CSI, the wireless device comprising:
a memory module configured to store first and second CSI reports, the first CSI report associated with a first beam, the second CSI report associated with a second beam, the second CSI report including at least a co-phasing coefficient between the first and second beams;
a CSI report generator module configured to generate the first and second CSI reports; and
a transceiver module configured to transmit the first and second CSI reports to a network node.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations used in the preceding description include:
1D One dimensional
2D Two-Dimensional
3GPP Third Generation Partnership Project
5G Fifth Generation
ACK Acknowledgement
ASIC Application Specific Integrated Circuit
ARQ Automatic Retransmission Request
CA Carrier Aggregation
CB Codebook
CDMA Code Division Multiple Access
CFAI CSI Feedback Accuracy Indicator
CFI Control Information Indicator
CP Cyclic Prefix
CPU Central Processing Unit
CQI Channel Quality Indicators
CRS Common Reference Symbol/Signal
CSI Channel State Information
CSI-RS Channel State Information Reference Symbol/Signal
dB Decibel
DCI Downlink Control Information
DFT Discrete Fourier Transform
DL Downlink
eNB Enhanced or Evolved Node B
DP Dual Polarization
EPC Evolved Packet Core
EPDCCH Enhanced Physical Downlink Control Channel
EPRE Energy per Resource Element
E-UTRAN Evolved or Enhanced Universal Terrestrial Radio Access Network
FDD Frequency Division Duplexing
FD-MIMO Full Dimension MIMO
FFT Fast Fourier Transform
FPGA Field Programmable Gate Array
GSM Global System for Mobile Communications
HARQ Hybrid ARQ
ID Identifier
IFFT Inverse FFT
LSB Least Significant Bit
LTE Long Term Evolution
M2M Machine-to-Machine
MCS Modulation and Coding Scheme (or State)
MIMO Multiple Input Multiple Output
MME Mobility Management Entity
MSB Most Significant Bit
MU-MIMO Multi-User MIMO
NAK Non-Acknowledgement
NZP Non-Zero Power
OCC Orthogonal Cover Code
OFDM Orthogonal Frequency Division Multiplexing
PCFICH Physical Control Format Indicator Channel
PDA Personal Data Assistance
PDCCH Physical Downlink Control Channel
PDSCH Physical Downlink Shared Channel
PRB Physical Resource Block
PMI Precoder Matrix Indicator
PUCCH Physical Uplink Control Channel
PUSCH Physical Uplink Shared Channel
QPSK Quadrature Phase Shift Keying
RB Resource Block
RE Resource Element
Rel Release
RI Rank Indicator
RRC Radio Resource Control
SINR Signal to Interference plus Noise Ratio
SNR Signal to Noise Ratio
SP Single Polarization
SR Scheduling Request
SU-MIMO Single User MIMO
TDD Time Division Duplexing
TFRE Time/Frequency Resource Element
TP Transmission Point
TS Technical Specification
Tx Transmit
UE User Equipment
UL Uplink
ULA Uniform Linear Array
UMB Ultra Mobile Broadband
UPA Uniform Planar Array
WCDMA Wideband Code Division Multiple Access
ZP Zero Power It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A user equipment configured to determine multi-beam channel state information, CSI, the user equipment comprising:
processing circuitry configured to generate a first and a second CSI reports, the first CSI report associated with a first beam, the second CSI report associated with a second beam, the second CSI report being a progressive advanced report including at least a precoder W corresponding to the first and second beams, the precoder W being based on at least a co-phasing coefficient between the first and second beams, the co-phasing coefficient being a matrix of complex coefficients for co-phasing the first and second beams to construct a linear combination of beams; and a transceiver configured to transmit the first and second CSI reports to a base station.

2. The user equipment of claim 1, wherein the processing circuitry is further configured to select the first and second beams according to a subband.

3. The user equipment of claim 1, wherein the first beam provides greater signal power to the user equipment than the second beam.

4. The user equipment of claim 1, wherein each of the first and second CSI reports includes at least a precoder indicator.

5. The user equipment of claim 1, wherein the first CSI report (50) includes a first precoder, the second CSI report includes a second precoder and a linear combination of the first and second precoders has a channel estimation accuracy exceeding a channel estimation accuracy of any one of the first and second precoders.

6. The user equipment of claim 1, wherein each of the first and second beams has associated an ordered set of complex numbers, each complex number mapped to an antenna port of an antenna array.

7. The user equipment of claim 1, wherein a phase difference between any two complex numbers associated with two adjacent antenna ports is a constant.

8. The user equipment of claim 1, wherein the co-phasing coefficient is a complex number.

9. A user equipment configured to report a precoder W, for a plurality of antenna ports E at a base station, the precoder W being a linear combination of at least a first and a second sub-precoder, the user equipment comprising:
   a processor; and
   a memory storing instructions that, when executed, configure the processor to:
      receive from the base station in a first time instance, a first CSI feedback request requesting CSI feedback;
      report a first CSI report identifying the first sub-precoder, the first CSI report including at least a CSI feedback accuracy indicator;
      receive from the base station in a second time instance, a second CSI feedback request requesting additional CSI feedback, the second CSI feedback request being based at least on the CSI feedback accuracy indicator of the first CSI report; and
      report a second CSI report identifying the second sub-precoder.

10. The user equipment of claim 9, wherein the at least first and second sub-precoders are determined by the user equipment based on received channel state information reference signals, CSI-RS, in a subframe from the base station.

11. The user equipment of claim 9, wherein CSI reference signals, CSI-RS, are received in a same subframe as the first CSI feedback request.

12. The user equipment of claim 9, wherein the first sub-precoder comprises a first orthogonal Discrete Fourier Transform, DFT, beam and the second sub-precoder comprises a second DFT beam.

* * * * *